(12) United States Patent
Han et al.

(10) Patent No.: US 12,246,593 B2
(45) Date of Patent: Mar. 11, 2025

(54) TRANSMISSION OF AGRICULTURAL WORK VEHICLE

(71) Applicant: LS MTRON LTD., Anyang-si (KR)

(72) Inventors: Jung Su Han, Anyang-si (KR); Ki Taeg Lee, Anyang-si (KR); Won Woo Park, Anyang-si (KR); Ji Hun Yu, Anyang-si (KR); Taek Seong Kim, Anyang-si (KR); Young-Gyu Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 18/392,705

(22) Filed: Dec. 21, 2023

(65) Prior Publication Data

US 2024/0140195 A1     May 2, 2024

Related U.S. Application Data

(63) Continuation of application No. 17/274,711, filed as application No. PCT/KR2019/010627 on Aug. 21, 2019, now Pat. No. 11,897,327.

(30) Foreign Application Priority Data

Sep. 18, 2018  (KR) ........................ 10-2018-0111812
Sep. 18, 2018  (KR) ........................ 10-2018-0111815

(51) Int. Cl.
*B60K 17/08*     (2006.01)
*B60K 17/02*     (2006.01)
(Continued)

(52) U.S. Cl.
CPC .............. *B60K 17/08* (2013.01); *B60K 17/02* (2013.01); *F16D 13/52* (2013.01)

(58) Field of Classification Search
CPC ......... B60K 17/08; B60K 17/02; F16D 13/52; F16H 3/006
(Continued)

(56) References Cited

U.S. PATENT DOCUMENTS 8,725,372 B2     5/2014 Rinck et al.
11,629,781 B2 *  4/2023 Hirase ..................... F16H 47/04
                                                       475/72
(Continued)

FOREIGN PATENT DOCUMENTS

CN    103282697 A    9/2013
EP      0797025 A1   9/1997
(Continued)

OTHER PUBLICATIONS

International Search Report for related International Application No. PCT/KR2019/010627; report dated Mar. 26, 2020; (5 pages).
(Continued)

*Primary Examiner* — Ha Dinh Ho
(74) *Attorney, Agent, or Firm* — K&L Gates LLP

(57) ABSTRACT

The present disclosure relates to a transmission of an agricultural work vehicle, the transmission comprising: a pre-shift part for performing speed shifting on driving transmitted from an engine of an agricultural work vehicle; a clutch part connected to the pre-shift part so as to selectively output driving transmitted from the pre-shift part; an adjusting part connected to the clutch part so as to perform speed shifting on driving transmitted from the clutch part; and a subsequent shift part connected to the adjusting part so as to perform speed shifting on driving transmitted from the adjusting part.

10 Claims, 19 Drawing Sheets

(51) Int. Cl.
  *F16D 13/52* (2006.01)
  *F16H 3/00* (2006.01)
(58) Field of Classification Search
  USPC .............................................. 74/665 G, 330
  See application file for complete search history.

(56) References Cited

U.S. PATENT DOCUMENTS

| | | | |
|---|---|---|---|
| 2003/0054920 A1* | 3/2003 | Berger .............. | B60W 30/1819 |
| | | | 477/109 |
| 2007/0017309 A1 | 1/2007 | Hasegawa et al. | |
| 2011/0036186 A1 | 2/2011 | Gumpoltsberger et al. | |
| 2014/0196556 A1* | 7/2014 | Beck ..................... | F16H 37/043 |
| | | | 74/331 |

FOREIGN PATENT DOCUMENTS

| | | |
|---|---|---|
| JP | 2003278852 A | 10/2003 |
| JP | 2003314679 A | 11/2003 |
| JP | 2006275115 A | 10/2006 |
| JP | 2008208912 A | 9/2008 |
| KR | 101326416 B1 | 11/2013 |
| KR | 20150125089 A | 11/2015 |
| KR | 20160064676 A | 6/2016 |
| KR | 101766153 B1 | 8/2017 |
| WO | 2011152374 A1 | 12/2011 |
| WO | 2012159793 A1 | 11/2012 |
| WO | 20130167095 A1 | 11/2013 |

OTHER PUBLICATIONS

Written Opinion for related International Application No. PCT/KR2019/010627; report dated Mar. 26, 2020; (4 pages).
Extended European Search Report for related European Application No. 19863292.9; action dated May 19, 2022; (22 pages).
Office Action for related Chinese Application No. 201980040400.6; action dated Jun. 6, 2023; (12 pages).

* cited by examiner

TRANSMISSION OF AGRICULTURAL WORK VEHICLE

CROSS-REFERENCE TO RELATED APPLICATIONS

The present application Continuation Application based on U.S. application Ser. No. 17/274,711, filed on Mar. 9, 2021, which is a National Stage of International Application No. PCT/KR2019/010627, filed Aug. 21, 2019, which claims priority to Korean Application No. 10-2018-0111812 filed on Sep. 18, 2018 and Korean Application No. 10-2018-0111815 filed on Sep. 18, 2018, the disclosures of which are incorporated herein by reference.

FIELD

The present disclosure relates to a transmission of an agricultural working vehicle, which is configured to adjust a speed of the agricultural working vehicle.

BACKGROUND

Agricultural working vehicles are used for cultivating crops, which are necessary for human life, using land. For example, a combine, a tractor, and the like correspond to agricultural working vehicles. The combine is configured to cut and thresh crops such as rice, wheat, beans, and the like. The tractor is configured to do work necessary for cultivating crops using pulling power.

Such agricultural working vehicles include a transmission to adjust torque, speed, and the like as necessary during a working process.

FIG. 1 is a schematic block diagram illustrating a transmission of an agricultural working vehicle according to a related art.

Referring to FIG. 1, a transmission 100 of the agricultural working vehicle according to the related art includes a primary transmission portion 110 configured to perform shifting with respect to driving transmitted from an engine 10 and a secondary transmission portion 120 configured to perform shifting with respect to driving transmitted from the primary transmission portion 110.

The primary transmission portion 110 includes a first driving shaft 111, a first transmission gear 112, a second transmission gear 113, a first sleeve 114, a second driving shaft 115, a third transmission gear 116, a fourth transmission gear 117, and a second sleeve 118.

The first transmission gear 112, the second transmission gear 113, and the first sleeve 114 are coupled to the first driving shaft 111.

The first transmission gear 112 and the second transmission gear 113 are coupled to the first driving shaft 111 to be idly rotatable. The second transmission gear 113 and the first transmission gear 112 are formed to have different diameters.

The first sleeve 114 is coupled to the first driving shaft 111 to be located between the first transmission gear 112 and the second transmission gear 113. The first sleeve 114 and the first driving shaft 111 are coupled to rotate together. When the first sleeve 114 is engaged with neither of the first transmission gear 112 and the second transmission gear 113, the first sleeve 114 changes to a neutral state. When the first sleeve 114 is engaged with the first transmission gear 112 or the second transmission gear 113, the first sleeve 114 changes to an engaged state.

The third transmission gear 116, the fourth transmission gear 117, and the second sleeve 118 are coupled to the second driving shaft 115. The second driving shaft 115 and the first driving shaft 111 are disposed to be parallel to each other.

The third transmission gear 116 and the fourth transmission gear 117 are configured to be coupled to the second driving shaft 115 to be idly rotatable. The fourth transmission gear 117 and the third transmission gear 116 are formed to have different diameters.

The second sleeve 118 is coupled to the second driving shaft 115 to be located between the third transmission gear 116 and the fourth transmission gear 117. The second sleeve 118 and the second driving shaft 115 are coupled to rotate together. When the second sleeve 118 is engaged with neither of the third transmission gear 116 and the fourth transmission gear 117, the second sleeve 118 changes to a neutral state. When the second sleeve 118 is engaged with the third transmission gear 116 or the fourth transmission gear 117, the second sleeve 118 changes to an engaged state.

Here, in the transmission 100 of the agricultural working vehicle according to the related art, when the first sleeve 114 and the second sleeve 118 change to the engaged state at the same time, the primary transmission portion 110 or the secondary transmission portion 120 may be in danger of being damaged or broken. Accordingly, when the first sleeve 114 is in the engaged state, it is necessary that the second sleeve 118 changes to the engaged state after the first sleeve 114 changes to the neutral state. Accordingly, when the second sleeve 118 is in the engaged state, it is necessary that the first sleeve 114 changes to the engaged state after the second sleeve 118 changes to the neutral state. Accordingly, since it is imperative that both the first sleeve 114 and the second sleeve 118 change to the neutral state in the transmission 100 of the agricultural working vehicle according to the related art, there is a problem that shaking, impact, and the like occur in a shifting process.

SUMMARY

Therefore, the present disclosure is designed to solve the problems and is for providing a transmission of an agricultural working vehicle which may reduce shaking, impact, and the like occurring during a shifting process.

To solve the above problems, the present disclosure may include the following configurations.

A transmission of an agricultural working vehicle according to the present disclosure may include a preceding transmission portion configured to perform shifting with respect to driving transmitted from an engine of the agricultural working vehicle, a clutch portion connected to the preceding transmission portion to selectively output driving transmitted from the preceding transmission portion, an adjustment portion connected to the clutch portion to perform shifting with respect to driving transmitted from the clutch portion, and a succeeding transmission portion connected to the adjustment portion to perform shifting with respect to driving transmitted from the adjustment portion. Here, the preceding transmission portion may include a first preceding transmission unit configured to perform shifting with respect to the driving transmitted from the engine and a second preceding transmission unit configured to perform shifting with respect to the driving transmitted from the engine. The clutch portion may include a first clutch unit connected to the first preceding transmission unit to selectively output driving transmitted from the first preceding transmission unit and a second clutch unit connected to the second preceding transmission unit to selectively output driving transmitted from the second preceding transmission unit. The adjustment portion may include a first adjustment unit connected to the first clutch unit to perform shifting with respect to the driving transmitted from the first clutch unit using a gear ratio and a second adjustment unit connected to the second clutch unit to perform shifting with respect to the driving transmitted from the second clutch unit using a gear ratio different from that of the first adjustment unit. The succeeding transmission portion may include a first succeeding transmission unit connected to the first adjustment unit to perform shifting with respect to driving transmitted from the first adjustment unit and a second succeeding transmission unit connected to the second adjustment unit to perform shifting with respect to driving transmitted from the second adjustment unit.

A transmission of an agricultural working vehicle according to the present disclosure may include a preceding transmission portion configured to perform shifting with respect to driving transmitted from an engine of the agricultural working vehicle, an adjustment portion connected to the preceding transmission portion to perform shifting with respect to driving transmitted from the preceding transmission portion, a clutch portion connected to the adjustment portion to selectively output driving transmitted from the adjustment portion, and a succeeding transmission portion connected to the clutch portion to perform shifting with respect to driving transmitted from the clutch portion. Here, the preceding transmission portion may include a first preceding transmission unit configured to perform shifting with respect to the driving transmitted from the engine and a second preceding transmission unit configured to perform shifting with respect to the driving transmitted from the engine. The adjustment portion may include a first adjustment unit connected to the first preceding transmission unit to perform shifting with respect to the driving transmitted from the first preceding transmission unit using a gear ratio and a second adjustment unit connected to the second preceding transmission unit to perform shifting with respect to the driving transmitted from the second preceding transmission unit using a gear ratio different from that of the first adjustment unit. The clutch portion may include a first clutch unit connected to the first adjustment unit to selectively output driving transmitted from the first adjustment unit and a second clutch unit connected to the second adjustment unit to selectively output driving transmitted from the second adjustment unit. The succeeding transmission portion may include a first succeeding transmission unit connected to the first clutch unit to perform shifting with respect to driving transmitted from the first clutch unit and a second succeeding transmission unit connected to the second clutch unit to perform shifting with respect to driving transmitted from the second clutch unit.

According to the present disclosure, the transmission of the agricultural working vehicle may have the following effects.

Since the present disclosure is implemented to perform shifting without a process of all sleeves changing to a neutral state so as to reduce shaking, impact, and the like which occur in a shifting process, it is possible to assist in providing a driver with stable driving environments.

Since the present disclosure is implemented to share and modularize a first preceding transmission unit and a second preceding transmission unit, ease of manufacturing the first preceding transmission tool and the second preceding transmission tool may be improved and manufacturing costs may be reduced.

DETAILED DESCRIPTION

Hereinafter, embodiments of a transmission of an agricultural working vehicle according to the present disclosure will be described in detail with reference to the attached drawings.

Figure 1:
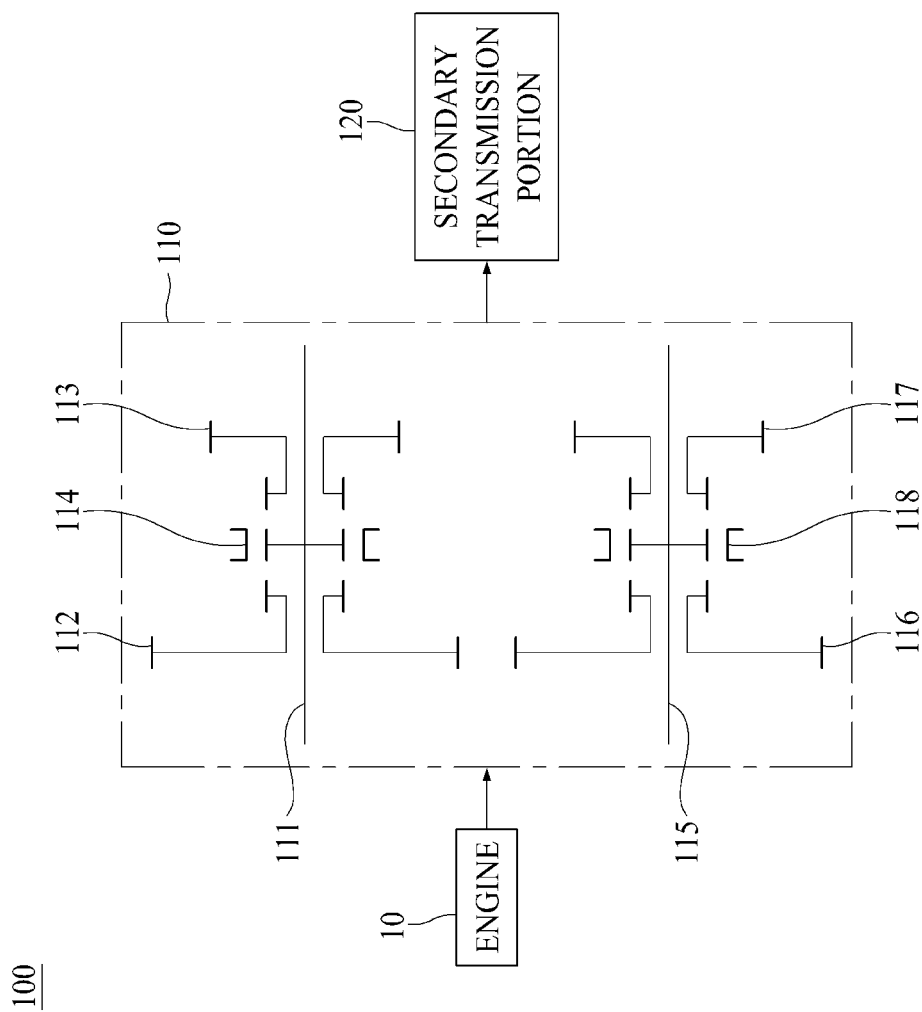
FIG. 1 is a schematic block diagram illustrating a transmission of an agricultural working vehicle according to a related art.
Figure 2:
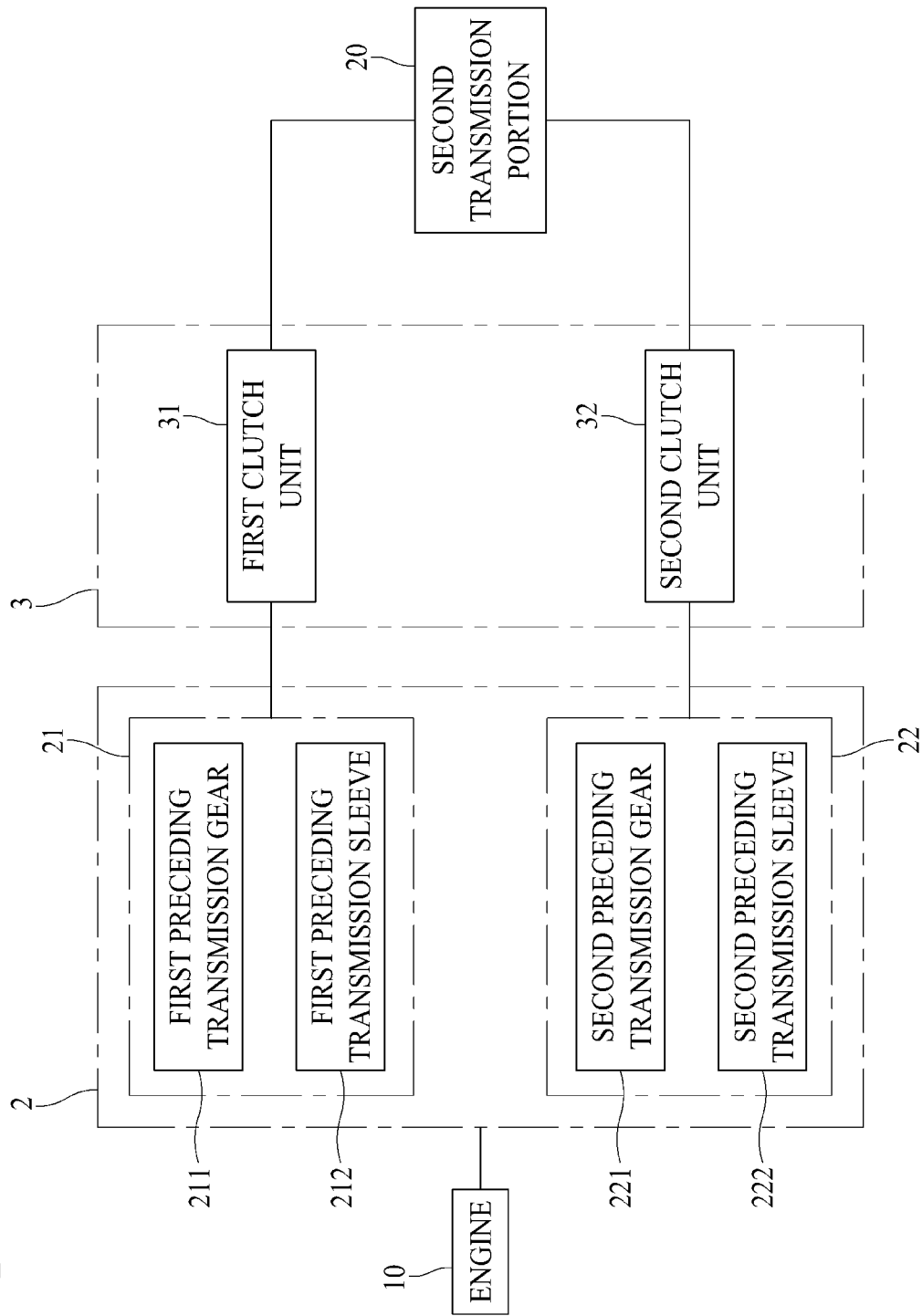
FIG. 2 is a schematic block diagram illustrating a transmission of an agricultural working vehicle according to the present disclosure.

Referring to FIG. 2, a transmission 1 of an agricultural working vehicle according to the present disclosure is installed on an agricultural working vehicle (not shown) such as a tractor, a combine, and the like. The transmission 1 of the agricultural working vehicle according to the present disclosure implements a transmission function of adjusting torque, speed, and the like with respect to driving transmitted from an engine 10 of the agricultural working vehicle as necessary. The transmission 1 of the agricultural working vehicle according to the present disclosure may include a preceding transmission portion 2 and a clutch portion 3.

Figure 3:
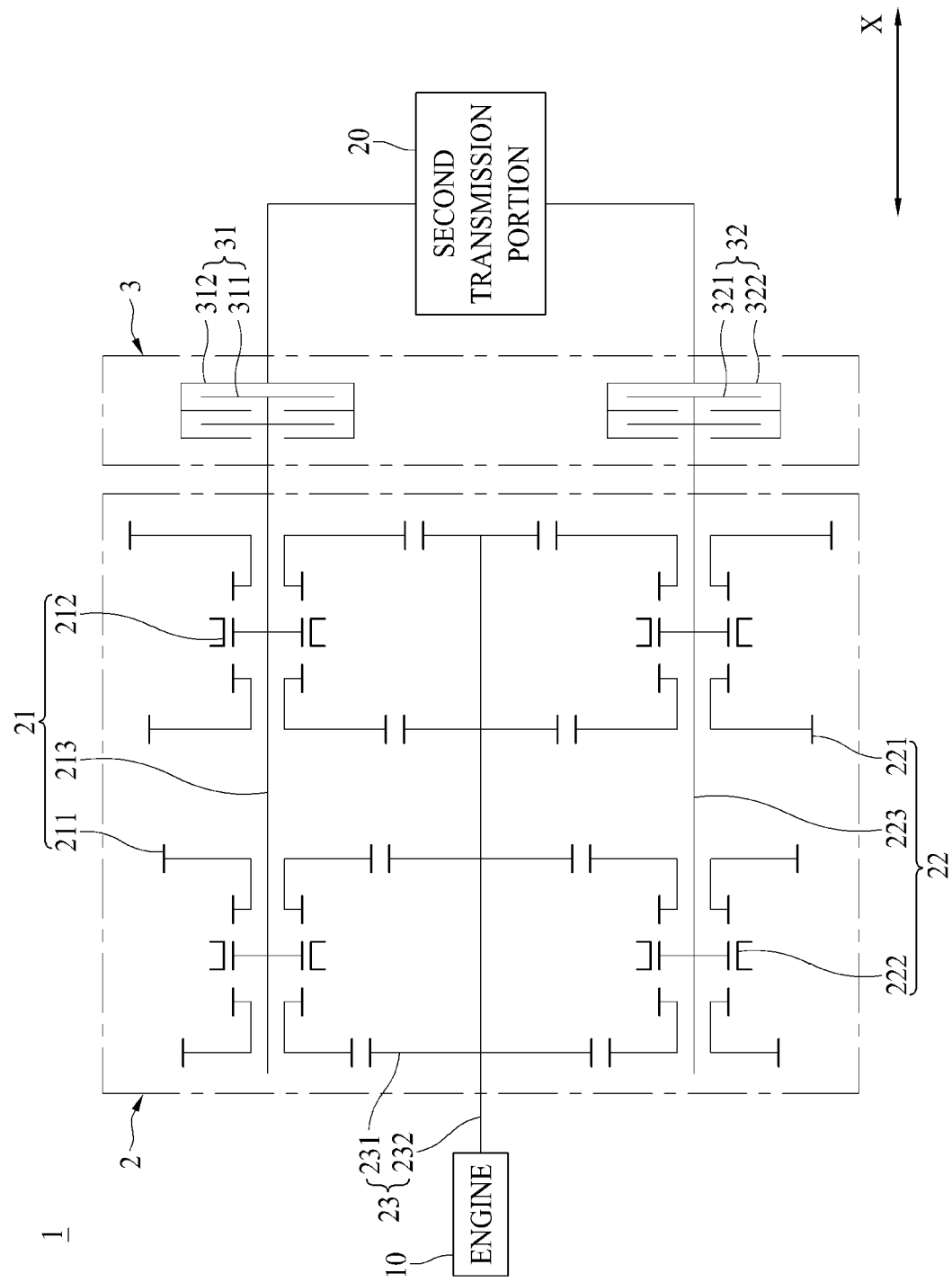
FIGS. 3 to 8 are schematic power transmission diagrams illustrating a preceding transmission portion and a clutch portion in the transmission of the agricultural working vehicle according to the present disclosure.

Referring to FIGS. 2 and 3, the preceding transmission portion 2 is configured to perform shifting with respect to driving transmitted from the engine 10. The preceding transmission portion 2 may be connected directly to the engine 10. The preceding transmission portion 2 may be connected to the engine 10 through a first transmission portion. In this case, driving generated by the engine 10 may be input to the preceding transmission portion 2 through the first transmission portion. Hereinafter, the driving transmitted from the engine 10 may include not only driving directly transmitted from the engine 10 but also driving transmitted from the engine 10 through the first transmission portion. For example, the first transmission portion may include a forward and backward transmission portion configured to perform shifting forward and backward.

The preceding transmission portion 2 may be implemented as a main transmission portion or a subsidiary transmission portion. Hereinafter, an embodiment in which the preceding transmission portion 2 is implemented as a main transmission portion will be described as an example.

The preceding transmission portion 2 may include a first preceding transmission unit 21 and a second preceding transmission unit 22.

The first preceding transmission unit 21 is configured to perform shifting with respect to the driving transmitted from the engine 10. The first preceding transmission unit 21 may be connected to the clutch portion 3. The driving transmitted from the engine 10 may be transmitted to the clutch portion 3 through the first preceding transmission unit 21.

The first preceding transmission unit 21 may include a plurality of first preceding transmission gears 211 and a first preceding transmission sleeve 212.

The first preceding transmission gears 211 are configured to rotate due to the driving transmitted from the engine 10. The first preceding transmission gears 211 may be coupled to a first preceding transmission shaft 213 to be idly rotatable. Bearings (not shown) may be installed between the first preceding transmission gears 211 and the first preceding transmission shaft 213. The first preceding transmission gears 211 may be arranged to be spaced apart from each other in a first axial direction (X-axis direction). The first axial direction (X-axis direction) is an axial direction parallel to the first preceding transmission shaft 213. The first preceding transmission gears 211 may be formed to have different diameters.

The first preceding transmission sleeve 212 is configured to be selectively engaged with the first preceding transmission gears 211. The first preceding transmission sleeve 212 may be disposed between the first preceding transmission gears 211 on the basis of the first axial direction (X-axis direction). The first preceding transmission sleeve 212 may be engaged with any one of the first preceding transmission gears 211 so as to change to an engaged state. The first preceding transmission sleeve 212 may be spaced apart from all of the first preceding transmission gears 211 so as to change to a neutral state. The first preceding transmission sleeve 212 may be coupled to the first preceding transmission shaft 213. Accordingly, when the first preceding transmission sleeve 212 is engaged with any one of the first preceding transmission gears 211, the first preceding transmission sleeve 212 may rotate the first preceding transmission shaft 213 while rotating. When the first preceding transmission sleeve 212 is spaced apart from all of the first preceding transmission gears 211, even though the first preceding transmission gears 211 rotate, the first preceding transmission sleeve 212 and the first preceding transmission shaft 213 do not rotate. The first preceding transmission sleeve 212 may be a synchronizer sleeve. The first preceding transmission sleeve 212 may be moved by a first driving unit (not shown) to change to the engaged state or the neutral state. The first driving unit may be an actuator.

According to the number of shifting steps executable by the preceding transmission portion 2, the first preceding transmission unit 21 may include a plurality of such first preceding transmission sleeves 212. In this case, the first preceding transmission sleeves 212 may be engaged selectively with the first preceding transmission gears 211 disposed on both sides thereof. The first preceding transmission sleeves 212 may be engaged selectively with the first preceding transmission gears 211 disposed on one side thereof. When the plurality of first preceding transmission sleeves 212 are provided, the first preceding transmission unit 21 may include a plurality of such first driving units. The first driving units may move the first preceding transmission sleeves 212 separately.

The second preceding transmission unit 22 is configured to perform shifting with respect to the driving transmitted from the engine 10. The second preceding transmission unit 22 may be connected to the clutch portion 3. The driving transmitted from the engine 10 may be transmitted to the clutch portion 3 through the second preceding transmission unit 22.

The second preceding transmission unit 22 may include a plurality of second preceding transmission gears 221 and a second preceding transmission sleeve 222.

The second preceding transmission gears 221 are configured to rotate due to the driving transmitted from the engine 10. The second preceding transmission gears 221 may be coupled to a second preceding transmission shaft 223 to be idly rotatable. Bearings (not shown) may be installed between the second preceding transmission gears 221 and the second preceding transmission shaft 223. The second preceding transmission shaft 233 may be disposed to be parallel to the first axial direction (X-axis direction). The second preceding transmission gears 221 may be arranged to be spaced apart from each other in the first axial direction (X-axis direction). The second preceding transmission gears 221 may be formed to have different diameters.

The second preceding transmission sleeve 222 is configured to be selectively engaged with the second preceding transmission gears 221. The second preceding transmission sleeve 222 may be disposed between the second preceding transmission gears 221 on the basis of the first axial direction (X-axis direction). The second preceding transmission sleeve 222 may be engaged with any one of the second preceding transmission gears 221 so as to change to an engaged state. The second preceding transmission sleeve 222 may be spaced apart from all of the second preceding transmission gears 221 so as to change to a neutral state. The second preceding transmission sleeve 222 may be coupled to the second preceding transmission shaft 223. Accordingly, when the second preceding transmission sleeve 222 is engaged with any one of the second preceding transmission gears 221, the second preceding transmission sleeve 222 may rotate the second preceding transmission shaft 223 while rotating. When the second preceding transmission sleeve 222 is spaced apart from all of the second preceding transmission gears 221, even though the second preceding transmission gears 221 rotate, the second preceding transmission sleeve 222 and the second preceding transmission shaft 223 do not rotate. The second preceding transmission sleeve 222 may be a synchronizer sleeve. The second preceding transmission sleeve 222 may be moved by a second driving unit (not shown) to change to the engaged state or the neutral state. The second driving unit may be an actuator.

According to the number of shifting steps executable by the preceding transmission portion 2, the second preceding transmission unit 22 may include a plurality of such second preceding transmission sleeves 222. In this case, the second preceding transmission sleeves 222 may be engaged selectively with the second preceding transmission gears 221 disposed on both sides thereof. The second preceding transmission sleeves 222 may be engaged selectively with the second preceding transmission gears 221 disposed on one side thereof. When the plurality of second preceding transmission sleeves 222 are provided, the second preceding transmission unit 22 may include a plurality of such second driving units. The second driving units may move the second preceding transmission sleeves 222 separately.

Referring to FIGS. 2 and 3, the preceding transmission portion 2 may include a preceding transmission input unit 23.

The preceding transmission input unit 23 is configured to transmit the driving transmitted from the engine 10 to each of the first preceding transmission unit 21 and the second preceding transmission unit 22. The first preceding transmission unit 21 and the second preceding transmission unit 22 may be connected to the preceding transmission input unit 23 so as to be connected to the engine 10 through the preceding transmission input unit 23.

The preceding transmission input unit 23 may include a plurality of preceding transmission input gears 231.

The preceding transmission input gears 231 may be engaged with each of the first preceding transmission gears 211 and the second preceding transmission gears 221. Accordingly, the preceding transmission input gears 231 may rotate the first preceding transmission gears 211 and the second preceding transmission gears 221 while rotating due to the driving transmitted from the engine 10. The preceding transmission input gears 231 may be coupled to a preceding transmission input shaft 232. The preceding transmission input shaft 232 may rotate the preceding transmission input gears 231 while rotating due to the driving transmitted from the engine 10. The preceding transmission input shaft 232 may be disposed to be parallel to the first axial direction (X-axis direction). The preceding transmission input gears 231 may be arranged to be spaced apart from each other in the first axial direction (X-axis direction).

The preceding transmission input gears 231 may be formed to have different diameters. Accordingly, shifting may be performed in a process of transmitting driving transmitted from the preceding transmission input gears 231 to the first preceding transmission gears 211 and the second preceding transmission gears 221.

Any one of the first preceding transmission gears 211 may be engaged with one side of each of the preceding transmission input gears 231, and any one of the second preceding transmission gears 221 may be engaged with the other side thereof. Accordingly, the preceding transmission input gears 231 may rotate the first preceding transmission gears 211 and the second preceding transmission gears 221 at the same time.

Referring to FIGS. 2 and 3, the clutch portion 3 is configured to be connected to the preceding transmission portion 2 to selectively output driving transmitted from the preceding transmission portion 2. The clutch portion 3 may be connected to a second transmission portion 20. The clutch portion 3 may selectively output the driving transmitted from the preceding transmission portion 2 to the second transmission portion 20. The second transmission portion 20 may additionally perform shifting with respect to driving transmitted from the clutch portion 3 and then output the additionally shifted driving to an axle.

The clutch portion 3 may include a first clutch unit 31 and a second clutch unit 32.

The first clutch unit 31 is configured to be connected to the first preceding transmission unit 21 to selectively output driving transmitted from the first preceding transmission unit 21. The first clutch unit 31 may selectively output the driving transmitted from the first preceding transmission unit 21 while the first preceding transmission sleeve 212 is engaged with any one of the first preceding transmission gears 211. The first clutch unit 31 may be coupled to the second transmission portion 20. The first clutch unit 31 may selectively output the driving transmitted from the first preceding transmission unit 21 to the second transmission portion 20. The first clutch unit 31 may be implemented as a multiple-disk clutch configured to selectively output driving using friction.

The first clutch unit 31 may include a plurality of first frictional member 311 and a plurality of second frictional members 312.

The first frictional members 311 may be coupled to the first preceding transmission shaft 213. Accordingly, the first frictional members 311 may rotate as the first preceding transmission shaft 213 rotates. The first frictional members 311 may be arranged to be spaced apart from each other in the first axial direction (X-axis direction).

The second frictional members 312 may come into selective contact with the first frictional members 311. The second frictional members 312 may be coupled to the second transmission portion 20. When the second frictional members 312 come into contact with the first frictional members 311, the second frictional members 312 may rotate as the first frictional members 311 rotate. Accordingly, the driving transmitted from the first preceding transmission unit 21 may be output to the second transmission portion 20 through the first frictional members 311 and the second frictional members 312. When the second frictional members 312 are spaced apart from the first frictional members 311, even though the first frictional members 311 rotate, the second frictional members 312 do not rotate. Accordingly, the driving transmitted from the first preceding transmission unit 21 may not be output to the second transmission portion 20.

As described above, the first clutch unit 31 may selectively output driving transmitted from the first preceding transmission shaft 213 depending on whether the first frictional members 311 come into contact with the second frictional members 312. The first clutch unit 31 may allow the second frictional members 312 to selectively come into contact with the first frictional members 311 using a working fluid such as an oil and the like. The first clutch unit 31 may allow the second frictional members 312 to selectively come into contact with the first frictional members 311 by supplying or discharging the working fluid according to a speed or the like of the agricultural working vehicle. The first clutch unit 31 may allow the second frictional members 312 to selectively come into contact with the first frictional members 311 by supplying or discharging the working fluid according to a shifting manipulation of a driver.

The second clutch unit 32 is configured to be connected to the second preceding transmission unit 22 to selectively output driving transmitted from the second preceding transmission unit 22. The second clutch unit 32 may selectively output the driving transmitted from the second preceding transmission unit 22 while the second preceding transmission sleeve 222 is engaged with any one of the second preceding transmission gears 221. Accordingly, even when the second preceding transmission sleeve 222 is engaged with any one of the second preceding transmission gears 221 in addition to a case in which the first preceding transmission sleeve 212 is engaged with any one of the first preceding transmission gears 211, each of the first clutch unit 31 and the second clutch unit 32 may selectively output driving. When the first clutch unit 31 operates to output driving, the second clutch unit 32 operates not to output driving. In this case, the first clutch unit 31 becomes an output path of driving. When the second clutch unit 32 operates to output driving, the first clutch unit 31 operates not to output driving. In this case, the second clutch unit 32 becomes an output path of driving.

Accordingly, the transmission 1 of the agricultural working vehicle according to the present disclosure may perform shifting by changing an output path of driving using the first clutch unit 31 and the second clutch unit 32 even when both the first preceding transmission sleeve 212 and the second preceding transmission sleeve 222 are in the engaged state. That is, the transmission 1 of the agricultural working vehicle according to the present disclosure may perform shifting without a process in which both the first preceding transmission sleeve 212 and the second preceding transmission sleeve 222 change to the neutral state. Accordingly, it is possible to reduce shaking, impact, and the like occurring during a shifting process so that the transmission 1 of the agricultural working vehicle according to the present disclosure may serve in providing a driver with stable driving environments.

The second clutch unit 32 may be coupled to the second transmission portion 20. The second clutch unit 32 may selectively output the driving transmitted from the second preceding transmission unit 22 to the second transmission portion 20. The second clutch unit 32 may be implemented as a multiple-disk clutch configured to selectively output driving using friction.

The second clutch unit 32 may include a plurality of third frictional members 321 and a plurality of fourth frictional members 322.

The third frictional members 321 may be coupled to the second preceding transmission shaft 223. Accordingly, the third frictional members 321 may rotate as the second preceding transmission shaft 223 rotates. The third frictional members 321 may be arranged to be spaced apart from each other in the first axial direction (X-axis direction).

The fourth frictional members 322 may come into selective contact with the third frictional members 321. The fourth frictional members 322 may be coupled to the second transmission portion 20. When the fourth frictional members 322 come into contact with the third frictional members 321, the fourth frictional members 322 may rotate as the third frictional members 321 rotate. Accordingly, the driving transmitted from the second preceding transmission unit 22 may be output to the second transmission portion 20 through the third frictional members 321 and the fourth frictional members 322. When the fourth frictional members 322 are spaced apart from the third frictional members 321, even though the third frictional members 321 rotate, the fourth frictional members 322 do not rotate. Accordingly, the driving transmitted from the second preceding transmission unit 22 may not be output to the second transmission portion 20.

As described above, the second clutch unit 32 may selectively output driving transmitted from the second preceding transmission shaft 223 depending on whether the third frictional members 321 come into contact with the fourth frictional members 322. The second clutch unit 32 may allow the fourth frictional members 322 to selectively come into contact with the third frictional members 321 using a working fluid such as an oil and the like. The second clutch unit 32 may allow the fourth frictional members 322 to selectively come into contact with the third frictional members 321 by supplying or discharging the working fluid according to a speed or the like of the agricultural working vehicle. The second clutch unit 32 may allow the fourth frictional members 322 to selectively come into contact with the third frictional members 321 by supplying or discharging the working fluid according to a shifting manipulation of a driver.

Figure 4:
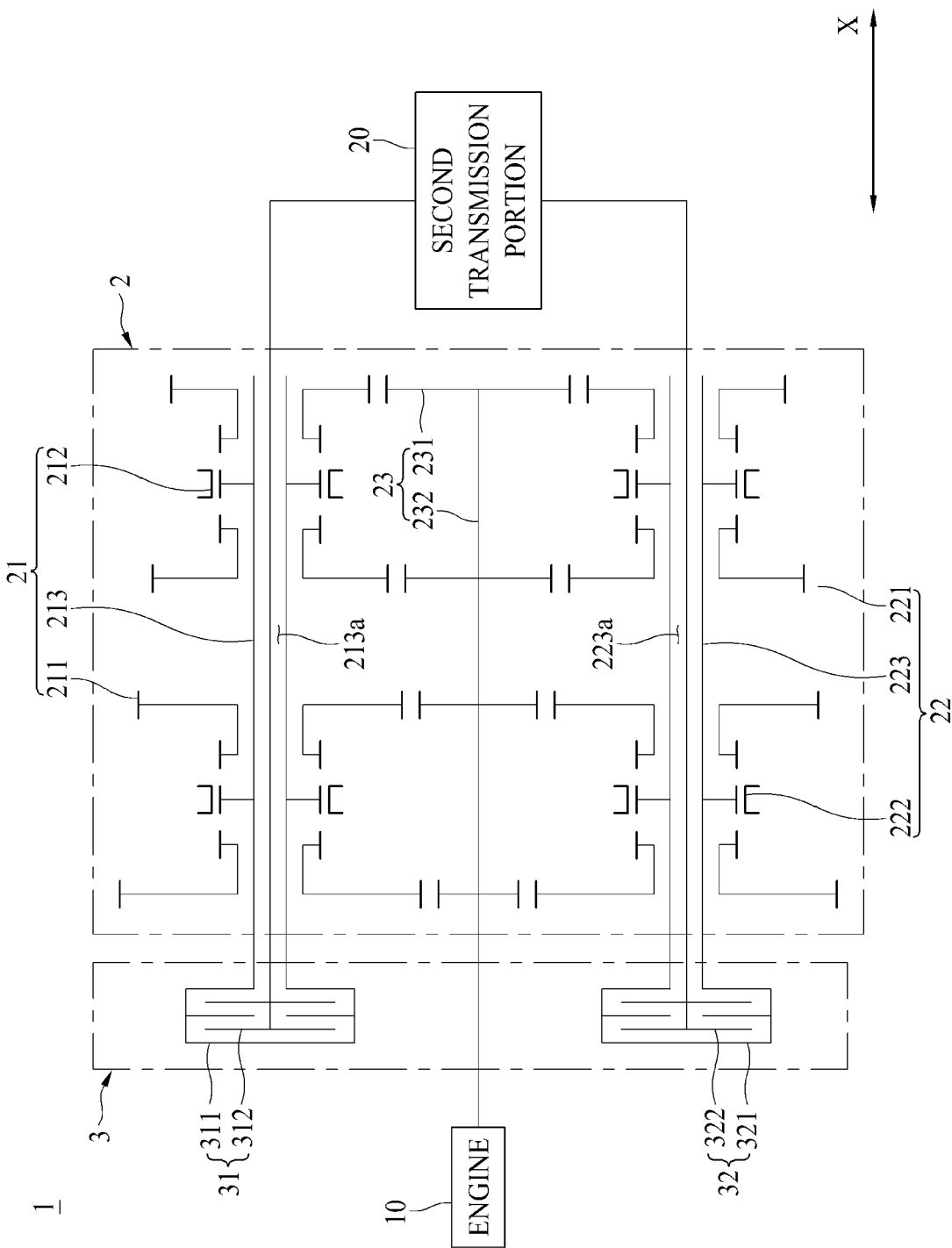

Referring to FIGS. 3 and 4, the clutch portion 3 may be disposed at a rear end of the preceding transmission portion 2 as well as being disposed at a front end of the second transmission portion 20 on the basis of a sequence of transmitting driving. In this case, the clutch portion 3, the preceding transmission portion 2, and the second transmission portion 20 may be disposed on the basis of the first axial direction (X-axis direction) as follows.

First, as shown in FIG. 3, on the basis of the first axial direction (X-axis direction), the clutch portion 3 may be disposed between the preceding transmission portion 2 and the second transmission portion 20. In this case, on the basis of the first axial direction (X-axis direction), the first clutch unit 31 may be disposed between the first preceding transmission unit 21 and the second transmission portion 20. On the basis of the first axial direction (X-axis direction), the second clutch unit 32 may be disposed between the second preceding transmission unit 22 and the second transmission portion 20.

Subsequently, as shown in FIG. 4, on the basis of the first axial direction (X-axis direction), the preceding transmission portion 2 may be disposed between the clutch portion 3 and the second transmission portion 20. In this case, on the basis of the first axial direction (X-axis direction), the first preceding transmission unit 21 may be disposed between the first clutch unit 31 and the second transmission portion 20. When the first preceding transmission unit 21 is disposed between the first clutch unit 31 and the second transmission portion 20 on the basis of the first axial direction (X-axis direction), a first through hole 213a may be formed in the first preceding transmission shaft 213. The first through hole 213a may be formed to pass through the first preceding transmission shaft 213. The first clutch unit 31 may be connected to the second transmission portion 20 using the first through hole 213a. On the basis of the first axial direction (X-axis direction), the second preceding transmission unit 22 may be disposed between the second clutch unit 32 and the second transmission portion 20. When the second preceding transmission unit 22 is disposed between the second clutch unit 32 and the second transmission portion 20 on the basis of the first axial direction (X-axis direction), a second through hole 223a may be formed in the second preceding transmission shaft 223. The second through hole 223a may be formed to pass through the second preceding transmission shaft 223. The second clutch unit 32 may be connected to the second transmission portion 20 using the second through hole 223a.

Referring to FIGS. 3 and 4, as shifting is performed by the preceding transmission portion 2, the clutch portion 3 may be connected to the preceding transmission portion 2 to selectively output driving at reduced speed. That is, on the basis of the sequence of transmitting driving, the clutch portion 3 is disposed at the rear end of the preceding transmission portion 2. The embodiment may promote the following working effects in comparison to a first comparative example in which the clutch portion 3 is disposed at a front end of the preceding transmission portion 2 on the basis of the sequence of transmitting driving.

First, in the first comparative example, since the clutch portion 3 is disposed at the front end of the preceding transmission portion 2, the preceding transmission portion 2 performs shifting with respect to the driving transmitted from the clutch portion 3. Accordingly, the first comparative example is implemented so that the clutch portion 3 selectively outputs driving at a speed not reduced by the preceding transmission portion 2.

Subsequently, since the embodiment is implemented so that the clutch portion 3 is disposed at the rear end of the preceding transmission portion 2, the clutch portion 3 selectively outputs driving at a speed reduced by the preceding transmission portion 2. Accordingly, in comparison to the first comparative example, the embodiment is implemented so that the clutch portion 3 selectively outputs driving while rotating at a lower speed. Accordingly, in comparison to the first comparative example, the embodiment may reduce centrifugal oil pressure. Also, in comparison to the first comparative example, the embodiment may reduce drag torque generated in the clutch portion 3 when the clutch portion 3 does not output driving as well as reducing heat generated in the clutch portion 3 so as to improve efficiency in shifting.

Referring to FIGS. 3 and 4, the clutch portion 3 may be connected to the second transmission portion 20 to selectively output driving to the second transmission portion 20. That is, on the basis of the sequence of transmitting driving, the clutch portion 3 is disposed at the front end of the second transmission portion 20. The embodiment may promote the following working effects in comparison to a second comparative example in which the clutch portion 3 is disposed at a rear end of the second transmission portion 20 on the basis of the sequence of transmitting driving.

First, since the second comparative example is implemented so that the clutch portion 3 is disposed at the rear end of the second transmission portion 20, the clutch portion 3 selectively outputs driving transmitted from the second transmission portion 20. Accordingly, the second comparative example is implemented so that the clutch portion 3 selectively outputs driving at a speed reduced by the preceding transmission portion 2 and then additionally reduced by the second transmission portion 20.

Subsequently, since the embodiment is implemented so that the clutch portion 3 is disposed at the front end of the second transmission portion 20, the second transmission portion 20 performs shifting with respect to the driving transmitted from the clutch portion 3. Accordingly, the embodiment is implemented so that the clutch portion 3 selectively outputs driving at a speed reduced by only the preceding transmission portion 2. That is, the embodiment is implemented so that the clutch portion 3 selectively outputs driving at a speed not reduced by the second transmission portion 20. Accordingly, in comparison to the second comparative example, the embodiment is implemented so that the clutch portion 3 selectively outputs driving while rotating at higher speed. Accordingly, in comparison to the second comparative example, in the embodiment, the clutch portion 3 may transmit smaller torque so as to be further miniaturized.

Referring to FIGS. 5 to 8, the preceding transmission portion 2 and the clutch portion 3 may be implemented to perform eight steps of shifting. In this case, the first preceding transmission unit 21, the second preceding transmission unit 22, the preceding transmission input unit 23, the first clutch unit 31, and the second clutch unit 32 may be implemented as follows.

First, the first preceding transmission unit 21 may include a first preceding transmission gear 211a (hereinafter, referred to as a first gear 211a) corresponding to a first step, a first preceding transmission gear 211b (hereinafter, referred to as a third gear 211b) corresponding to a third step, a first preceding transmission gear 211c (hereinafter, referred to as a fifth gear 211c) corresponding to a fifth step, a first preceding transmission gear 211d (hereinafter, referred to as a seventh gear 211d) corresponding to a seventh step, a first preceding transmission sleeve 212a (hereinafter, referred to as a first low-step sleeve 212a) selectively engaged with the first gear 211a and the third gear 211b, and a first preceding transmission sleeve 212b (hereinafter, referred to as a first high-step sleeve 212b) selectively engaged with the fifth gear 211c and the seventh gear 211d. When arranged in order from a large diameter to a small diameter, the first gear 211a, the third gear 211b, the fifth gear 211c, and the seventh gear 211d are sequentially arranged. The first gear 211a, the third gear 211b, the fifth gear 211c, and the seventh gear 211d may be coupled to the first preceding transmission shaft 213 to be idly rotatable while being spaced apart from one another in the first axial direction (X-axis direction). The first low-step sleeve 212a and the first high-step sleeve 212b may be coupled to the first preceding transmission shaft 213 to rotate with the first preceding transmission shaft 213 together.

Next, the second preceding transmission unit 22 may include a second preceding transmission gear 221a (hereinafter, referred to as a second gear 221a) corresponding to a second step, a second preceding transmission gear 221b (hereinafter, referred to as a fourth gear 221b) corresponding to a fourth step, a second preceding transmission gear 221c (hereinafter, referred to as a sixth gear 221c) corresponding to a sixth step, a second preceding transmission gear 221d (hereinafter, referred to as an eighth gear 222d) corresponding to an eighth step, a second preceding transmission sleeve 222a (hereinafter, referred to as a second low-step sleeve 222a) selectively engaged with the second gear 221a and the fourth gear 221b, and a second preceding transmission sleeve 222b (hereinafter, referred to as a second high-step sleeve 222b) selectively engaged with the sixth gear 221c and the eighth gear 221d. When arranged in order from a large diameter to a small diameter, the second gear 221a, the fourth gear 221b, the sixth gear 221c, and the eighth gear 221d are sequentially arranged. The second gear 221a, the fourth gear 221b, the sixth gear 221c, and the eighth gear 221d may be coupled to the second preceding transmission shaft 223 to be idly rotatable while being spaced apart from one another in the first axial direction (X-axis direction). The second low-step sleeve 222a and the second high-step sleeve 222b may be coupled to the second preceding transmission shaft 223 to rotate with the second preceding transmission shaft 223 together. The second low-step sleeve 222a, the second high-step sleeve 222b, the first low-step sleeve 212a, and the first high-step sleeve 212b may be separately moved by separate driving units.

Next, the preceding transmission input unit 23 may include a first preceding transmission input gear 231a engaged with each of the first gear 211a and the second gear 221a, a second preceding transmission input gear 231b engaged with each of the third gear 211b and the fourth gear 221b, a third preceding transmission input gear 231c engaged with each of the fifth gear 211c and the sixth gear 221c, and a fourth preceding transmission input gear 231d engaged with each of the seventh gear 211d and the eighth gear 221d. When arranged in order from a large diameter to a small diameter, the fourth preceding transmission input gear 231d, the third preceding transmission input gear 231c, the second preceding transmission input gear 231b, and the first preceding transmission input gear 231a are sequentially arranged. Accordingly, driving may be maximally reduced in speed while being transmitted from the first preceding transmission input gear 231a to the first gear 211a and the second gear 221a. Driving may be minimally reduced in speed while being transmitted from the fourth preceding transmission input gear 231d to the seventh gear 211d and the eighth gear 221d. The first preceding transmission input gear 231a, the second preceding transmission input gear 231b, the third preceding transmission input gear 231c, and the fourth preceding transmission input gear 231d may be disposed to be spaced apart from one another in the first axial direction (X-axis direction). The first preceding transmission input gear 231a, the second preceding transmission input gear 231b, the third preceding transmission input gear 231c, and the fourth preceding transmission input gear 231d may be coupled to the preceding transmission input shaft 232 to rotate with the preceding transmission input shaft 232 together.

Next, the first clutch unit 31 may be coupled to the first preceding transmission shaft 213. On the basis of the first axial direction (X-axis direction), the first gear 211a may be disposed between the first low-step sleeve 212a and the first clutch unit 31.

Next, the second clutch unit 32 may be coupled to the second preceding transmission shaft 223. On the basis of the first axial direction (X-axis direction), the second gear 221a may be disposed between the second low-step sleeve 222a and the second clutch unit 32.

The preceding transmission portion 2 and the clutch portion 3 which are implemented as described above may perform shifting by eight steps as follows.

Figure 5:
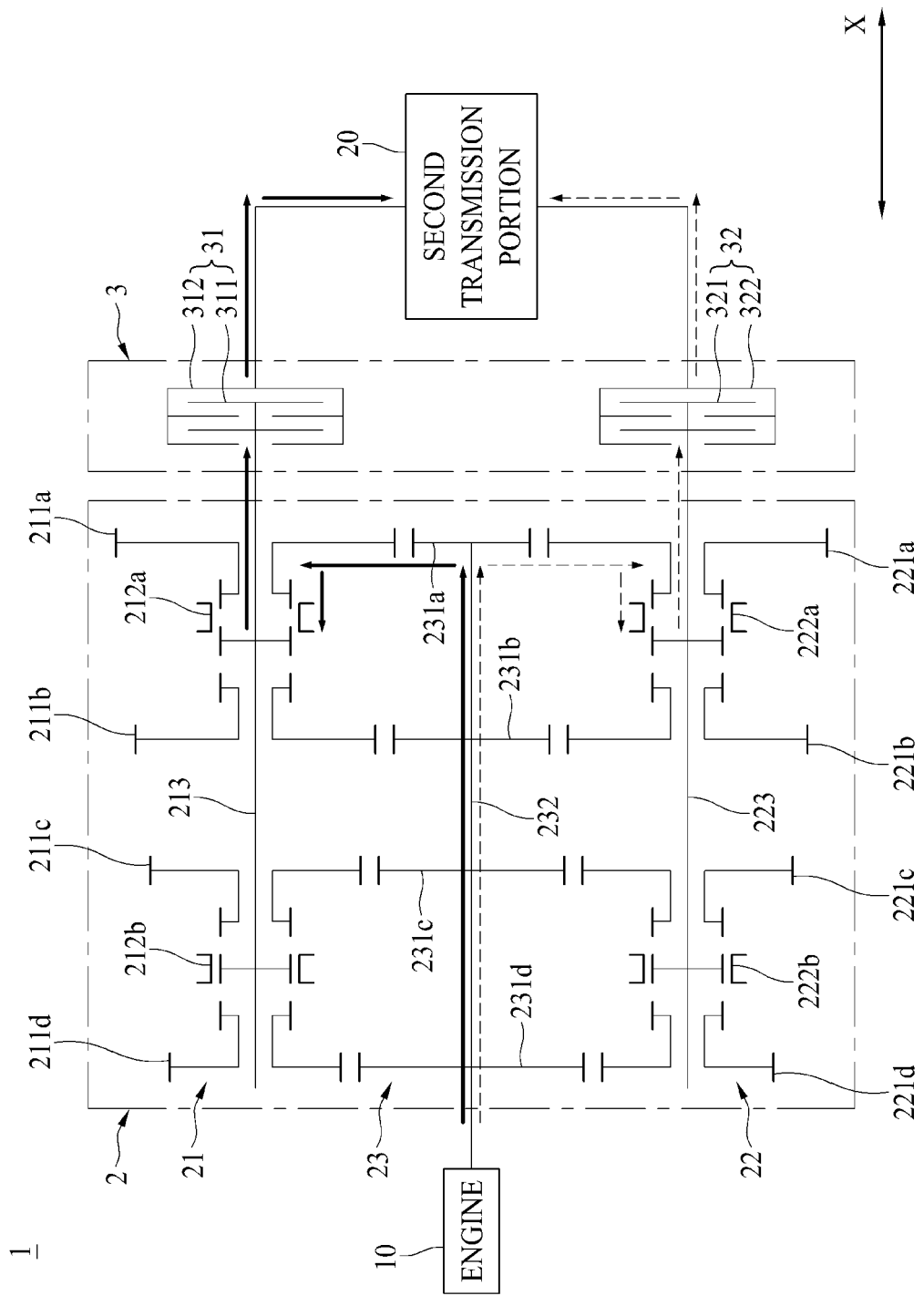
Figure 6:
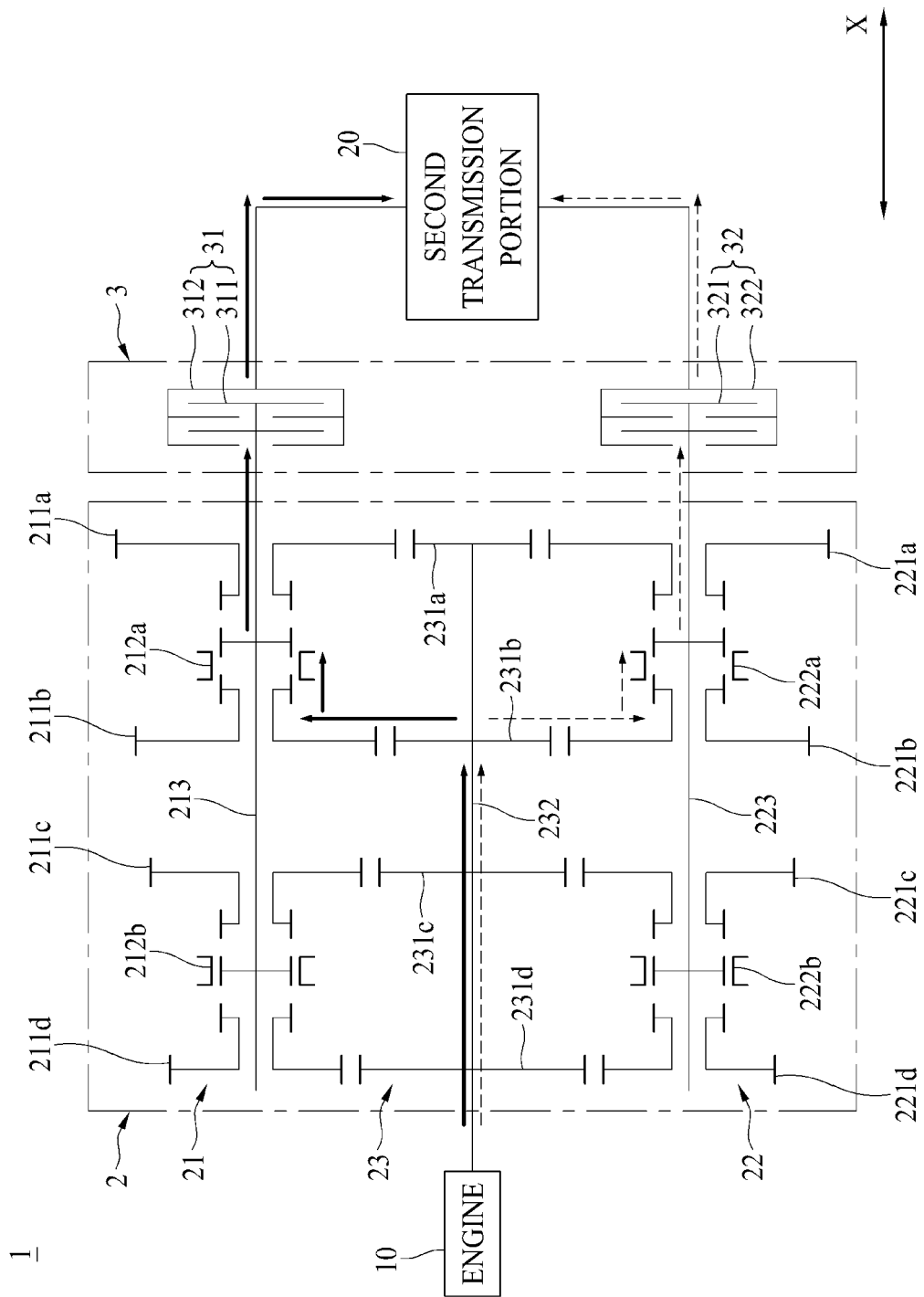
Figure 7:
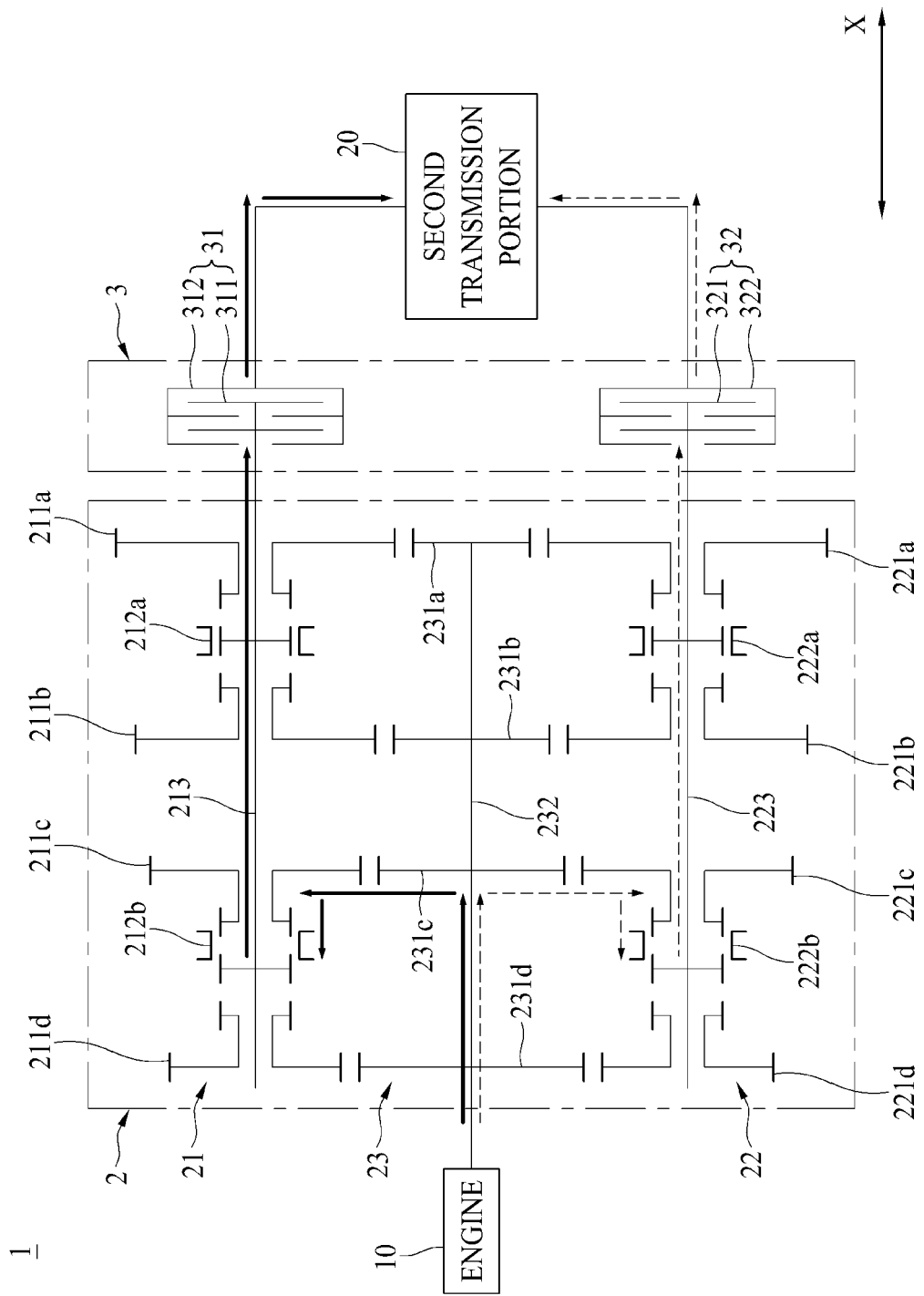
Figure 8:
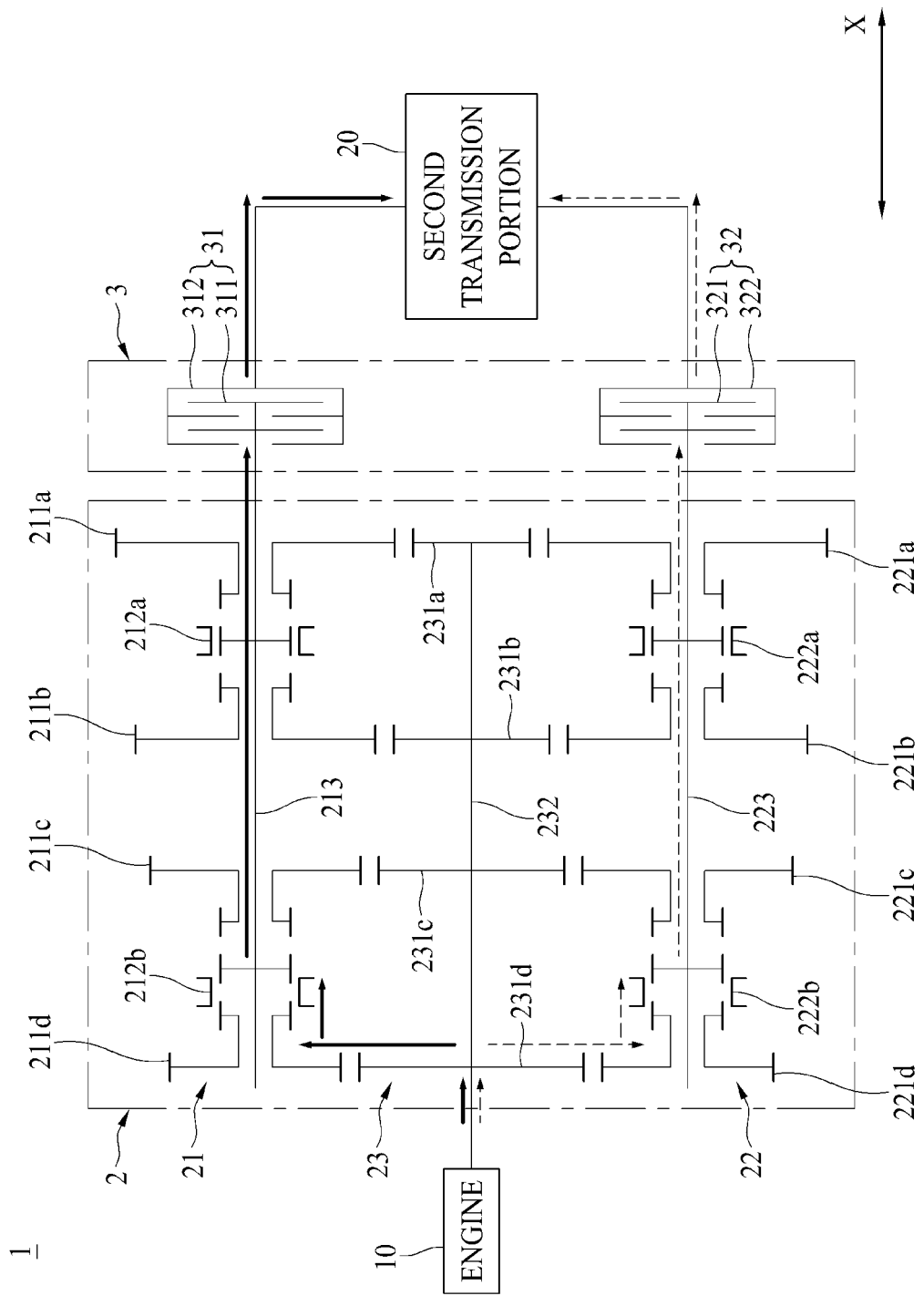

First, when the preceding transmission portion 2 and the clutch portion 3 perform shifting into the first step, as shown in FIG. 5, the first low-step sleeve 212a is engaged with the first gear 211a. Accordingly, the driving transmitted from the engine 10 may be transmitted to the first clutch unit 31 via the preceding transmission input shaft 232, the first preceding transmission input gear 231a, the first gear 211a, the first low-step sleeve 212a, and the first preceding transmission shaft 213. In this condition, the first clutch unit 31 may output the driving transmitted from the first preceding transmission shaft 213 to the second transmission portion 20 as the first frictional members 311 come into contact with the second frictional members 312. Accordingly, as shown by a solid line FIG. 5, the first clutch unit 31 may output the driving transmitted from the first preceding transmission shaft 213 to the second transmission portion 20. In this case, since the third frictional members 321 and the fourth frictional members 322 of the second clutch unit 32 are spaced apart from each other, the second clutch unit 32 does not output driving transmitted from the second preceding transmission shaft 223 to the second transmission portion 20. Accordingly, the preceding transmission portion 2 may perform shifting into the first step.

Subsequently, when the preceding transmission portion 2 and the clutch portion 3 perform shifting from the first step into the second step, the second low-step sleeve 222a may be engaged with the second gear 221a while the first clutch unit 31 outputs driving transmitted from the first gear 211a, the first low-step sleeve 212a, and the first preceding transmission shaft 213 to the second transmission portion 20. Accordingly, the driving transmitted from the engine 10 may be transmitted to the second clutch unit 32 via the preceding transmission input shaft 232, the first preceding transmission input gear 231a, the second gear 221a, the second low-step sleeve 222a, and the second preceding transmission shaft 223. In this case, since the third frictional members 321 and the fourth frictional members 322 are spaced apart from each other, the second clutch unit 32 does not output driving transmitted from the second preceding transmission shaft 223 to the second transmission portion 20.

While the first low-step sleeve 212a is engaged with the first gear 211a and the second low-step sleeve 222a is engaged with the second gear 221a as described above, the first frictional members 311 and the second frictional members 312 of the first clutch unit 31 may be spaced apart from each other and the third frictional members 321 and the fourth frictional members 322 of the second clutch unit 32 may come into contact with each other. Accordingly, as shown by a dotted line in FIG. 5, the second clutch unit 32 outputs driving transmitted from the second preceding transmission shaft 223 to the second transmission portion 20. In this case, the first clutch unit 31 does not output the driving transmitted from the first preceding transmission shaft 213 to the second transmission portion 20. Accordingly, while maintaining a state in which the first low-step sleeve 212a is engaged with the first gear 211a and the second low-step sleeve 222a is engaged with the second gear 221a, the preceding transmission portion 2 and the clutch portion 3 may perform shifting from the first step into the second step. In this case, the first clutch unit 31 and the second clutch unit 32 may allow the frictional members 311, 312, 321, and 322 to come into contact with and to be spaced apart from one another by supplying and discharging a working fluid. Accordingly, the transmission 1 of the agricultural working vehicle according to the present disclosure may further reduce shaking, impact, and the like which occur during a shifting process in comparison to shifting using sleeves.

Meanwhile, while the first low-step sleeve 212a is engaged with the first gear 211a and the second low-step sleeve 222a is engaged with the second gear 221a, the first frictional members 311 and the second frictional members 312 of the first clutch unit 31 may come into contact with each other and the third frictional members 321 and the fourth frictional members 322 of the second clutch unit 32 may be spaced apart from each other. Accordingly, while maintaining a state in which the first low-step sleeve 212a is engaged with the first gear 211a and the second low-step sleeve 222a is engaged with the second gear 221a, the preceding transmission portion 2 and the clutch portion 3 may perform shifting from the second step into the first step.

Subsequently, when the preceding transmission portion 2 and the clutch portion 3 perform shifting from the second step into the third step, the first low-step sleeve 212a may be engaged with the third gear 211b while the second clutch unit 32 outputs driving transmitted from the second gear 221a, the second low-step sleeve 222a, and the second preceding transmission shaft 223 to the second transmission portion 20. Accordingly, the driving transmitted from the engine 10 may be transmitted to the first clutch unit 31 via the preceding transmission input shaft 232, the second preceding transmission input gear 231b, the third gear 211b, the first low-step sleeve 212a, and the first preceding transmission shaft 213. In this case, since the first frictional members 311 and the second frictional members 312 are spaced apart from each other, the first clutch unit 31 does not output the driving transmitted from the first preceding transmission shaft 213 to the second transmission portion 20.

While the second low-step sleeve 222a is engaged with the second gear 221a and the first low-step sleeve 212a is engaged with the third gear 211*b* as described above, the third frictional members 321 and the fourth frictional members 322 of the second clutch unit 32 may be spaced apart from each other and the first frictional members 311 and the second frictional members 312 of the first clutch unit 31 may come into contact with each other. Accordingly, as a solid line shown in FIG. 6, the first clutch unit 31 outputs driving transmitted from the third gear 211*b*, the first low-step sleeve 212*a*, and the first preceding transmission shaft 213 to the second transmission portion 20. In this case, the second clutch unit 32 does not output the driving transmitted from the second preceding transmission shaft 223 to the second transmission portion 20. Accordingly, while maintaining a state in which the second low-step sleeve 222*a* is engaged with the second gear 221*a* and the first low-step sleeve 212*a* is engaged with the third gear 211*b*, the preceding transmission portion 2 and the clutch portion 3 may perform shifting from the second step into the third step.

Meanwhile, while the second low-step sleeve 222*a* is engaged with the second gear 221*a* and the first low-step sleeve 212*a* is engaged with the third gear 211*b*, the third frictional members 321 and the fourth frictional members 322 of the second clutch unit 32 may come into contact with each other and the first frictional members 311 and the second frictional members 312 of the first clutch unit 31 may be spaced apart from each other. Accordingly, while maintaining a state in which the second low-step sleeve 222*a* is engaged with the second gear 221*a* and the first low-step sleeve 212*a* is engaged with the third gear 211*b*, the preceding transmission portion 2 and the clutch portion 3 may perform shifting from the third step into the second step.

Subsequently, when the preceding transmission portion 2 and the clutch portion 3 perform shifting from the third step into the fourth step, the second low-step sleeve 222*a* may be engaged with the fourth gear 221*b* while the first clutch unit 31 outputs driving transmitted from the third gear 211*b*, the first low-step sleeve 212*a*, and the first preceding transmission shaft 213 to the second transmission portion 20. Accordingly, the driving transmitted from the engine 10 may be transmitted to the second clutch unit 32 via the preceding transmission input shaft 232, the second preceding transmission input gear 231*b*, the fourth gear 221*b*, the second low-step sleeve 222*a*, and the second preceding transmission shaft 223. In this case, since the third frictional members 321 and the fourth frictional members 322 are spaced apart from each other, the second clutch unit 32 does not output the driving transmitted from the second preceding transmission shaft 223 to the second transmission portion 20.

While the first low-step sleeve 212*a* is engaged with the third gear 211*b* and the second low-step sleeve 222*a* is engaged with the fourth gear 221*b* as described above, the first frictional members 311 and the second frictional members 312 of the first clutch unit 31 may be spaced apart from each other and the third frictional members 321 and the fourth frictional members 322 of the second clutch unit 32 may come into contact with each other. Accordingly, as shown by a dotted line in FIG. 6, the second clutch unit 32 outputs driving transmitted from the fourth gear 221*b*, the second low-step sleeve 222*a*, and the second preceding transmission shaft 223 to the second transmission portion 20. In this case, the first clutch unit 31 does not output the driving transmitted from the first preceding transmission shaft 213 to the second transmission portion 20. Accordingly, while maintaining a state in which the first low-step sleeve 212*a* is engaged with the third gear 211*b* and the second low-step sleeve 222*a* is engaged with the fourth gear 221*b*, the preceding transmission portion 2 and the clutch portion 3 may perform shifting from the third step into the fourth step.

Meanwhile, while the first low-step sleeve 212*a* is engaged with the third gear 211*b* and the second low-step sleeve 222*a* is engaged with the fourth gear 221*b*, the first frictional members 311 and the second frictional members 312 of the first clutch unit 31 may come into contact with each other and the third frictional members 321 and the fourth frictional members 322 of the second clutch unit 32 may be spaced apart from each other. Accordingly, while maintaining a state in which the first low-step sleeve 212*a* is engaged with the third gear 211*b* and the second low-step sleeve 222*a* is engaged with the fourth gear 221*b*, the preceding transmission portion 2 and the clutch portion 3 may perform shifting from the fourth step into the third step.

Subsequently, when the preceding transmission portion 2 and the clutch portion 3 perform shifting from the fourth step into the fifth step, the first high-step sleeve 212*b* may be engaged with the fifth gear 211*c* while the second clutch unit 32 outputs driving transmitted from the fourth gear 221*b*, the second low-step sleeve 222*a*, and the second preceding transmission shaft 223 to the second transmission portion 20. Accordingly, the driving transmitted from the engine 10 may be transmitted to the first clutch unit 31 via the preceding transmission input shaft 232, the third preceding transmission input gear 231*c*, the fifth gear 211*c*, the first high-step sleeve 212*b*, and the first preceding transmission shaft 213. In this case, since the first frictional members 311 and the second frictional members 312 are spaced apart from each other, the first clutch unit 31 does not output the driving transmitted from the first preceding transmission shaft 213 to the second transmission portion 20.

While the second low-step sleeve 222*a* is engaged with the fourth gear 221*b* and the first high-step sleeve 212*b* is engaged with the fifth gear 211*c* as described above, the third frictional members 321 and the fourth frictional members 322 of the second clutch unit 32 may be spaced apart from each other and the first frictional members 311 and the second frictional members 312 of the first clutch unit 31 may come into contact with each other. Accordingly, as a solid line shown in FIG. 7, the first clutch unit 31 outputs driving transmitted from the fifth gear 211*c*, the first high-step sleeve 212*b*, and the first preceding transmission shaft 213 to the second transmission portion 20. In this case, the second clutch unit 32 does not output the driving transmitted from the second preceding transmission shaft 223 to the second transmission portion 20. Accordingly, while maintaining a state in which the second low-step sleeve 222*a* is engaged with the fourth gear 221*b* and the first high-step sleeve 212*b* is engaged with the fifth gear 211*c*, the preceding transmission portion 2 and the clutch portion 3 may perform shifting from the fourth step into the fifth step.

Meanwhile, while the second low-step sleeve 222*a* is engaged with the fourth gear 221*b* and the first high-step sleeve 212*b* is engaged with the fifth gear 211*c*, the third frictional members 321 and the fourth frictional members 322 of the second clutch unit 32 may come into contact with each other and the first frictional members 311 and the second frictional members 312 of the first clutch unit 31 may be spaced apart from each other. Accordingly, while maintaining a state in which the second low-step sleeve 222*a* is engaged with the fourth gear 221*b* and the first high-step sleeve 212*b* is engaged with the fifth gear 211*c*, the preceding transmission portion 2 and the clutch portion 3 may perform shifting from the fifth step into the fourth step.

Subsequently, when the preceding transmission portion 2 and the clutch portion 3 perform shifting from the fifth step into the sixth step, the second high-step sleeve 222*b* may be engaged with the sixth gear 221*c* while the first clutch unit 31 outputs driving transmitted from the fifth gear 211*c*, the first high-step sleeve 212*b*, and the first preceding transmission shaft 213 to the second transmission portion 20. Accordingly, the driving transmitted from the engine 10 may be transmitted to the second clutch unit 32 via the preceding transmission input shaft 232, the third preceding transmission input gear 231*c*, the sixth gear 221*c*, the second high-step sleeve 222*b*, and the second preceding transmission shaft 223. In this case, since the third frictional members 321 and the fourth frictional members 322 are spaced apart from each other, the second clutch unit 32 does not output the driving transmitted from the second preceding transmission shaft 223 to the second transmission portion 20.

While the first high-step sleeve 212*b* is engaged with the fifth gear 211*c* and the second high-step sleeve 222*b* is engaged with the sixth gear 221*c* as described above, the first frictional members 311 and the second frictional members 312 of the first clutch unit 31 may be spaced apart from each other and the third frictional members 321 and the fourth frictional members 322 of the second clutch unit 32 may come into contact with each other. Accordingly, as shown by a dotted line in FIG. 7, the second clutch unit 32 outputs driving transmitted from the sixth gear 221*c*, the second high-step sleeve 222*b*, and the second preceding transmission shaft 223 to the second transmission portion 20. In this case, the first clutch unit 31 does not output the driving transmitted from the first preceding transmission shaft 213 to the second transmission portion 20. Accordingly, while maintaining a state in which the first high-step sleeve 212*b* is engaged with the fifth gear 211*c* and the second high-step sleeve 222*b* is engaged with the sixth gear 221*c*, the preceding transmission portion 2 and the clutch portion 3 may perform shifting from the fifth step into the sixth step.

Meanwhile, while the first high-step sleeve 212*b* is engaged with the fifth gear 211*c* and the second high-step sleeve 222*b* is engaged with the sixth gear 221*c*, the first frictional members 311 and the second frictional members 312 of the first clutch unit 31 may come into contact with each other and the third frictional members 321 and the fourth frictional members 322 of the second clutch unit 32 may be spaced apart from each other. Accordingly, while maintaining a state in which the first high-step sleeve 212*b* is engaged with the fifth gear 211*c* and the second high-step sleeve 222*b* is engaged with the sixth gear 221*c*, the preceding transmission portion 2 and the clutch portion 3 may perform shifting from the sixth step into the fifth step.

Subsequently, when the preceding transmission portion 2 and the clutch portion 3 perform shifting from the sixth step into the seventh step, the first high-step sleeve 212*b* may be engaged with the seventh gear 211*d* while the second clutch unit 32 outputs driving transmitted from the sixth gear 221*c*, the second high-step sleeve 222*b*, and the second preceding transmission shaft 223 to the second transmission portion 20. Accordingly, the driving transmitted from the engine 10 may be transmitted to the first clutch unit 31 via the preceding transmission input shaft 232, the fourth preceding transmission input gear 231*d*, the seventh gear 211*d*, the first high-step sleeve 212*b*, and the first preceding transmission shaft 213. In this case, since the first frictional members 311 and the second frictional members 312 are spaced apart from each other, the first clutch unit 31 does not output the driving transmitted from the first preceding transmission shaft 213 to the second transmission portion 20.

While the second high-step sleeve 222*b* is engaged with the sixth gear 221*c* and the first high-step sleeve 212*b* is engaged with the seventh gear 211*d* as described above, the third frictional members 321 and the fourth frictional members 322 of the second clutch unit 32 may be spaced apart from each other and the first frictional members 311 and the second frictional members 312 of the first clutch unit 31 may come into contact with each other. Accordingly, as a solid line shown in FIG. 8, the first clutch unit 31 outputs driving transmitted from the seventh gear 211*d*, the first high-step sleeve 212*b*, and the first preceding transmission shaft 213 to the second transmission portion 20. In this case, the second clutch unit 32 does not output the driving transmitted from the second preceding transmission shaft 223 to the second transmission portion 20. Accordingly, while maintaining a state in which the second high-step sleeve 222*b* is engaged with the sixth gear 221*c* and the first high-step sleeve 212*b* is engaged with the seventh gear 211*d*, the preceding transmission portion 2 and the clutch portion 3 may perform shifting from the sixth step into the seventh step.

Meanwhile, while the second high-step sleeve 222*b* is engaged with the sixth gear 221*c* and the first high-step sleeve 212*b* is engaged with the seventh gear 211*d*, the third frictional members 321 and the fourth frictional members 322 of the second clutch unit 32 may come into contact with each other and the first frictional members 311 and the second frictional members 312 of the first clutch unit 31 may be spaced apart from each other. Accordingly, while maintaining a state in which the second high-step sleeve 222*b* is engaged with the sixth gear 221*c* and the first high-step sleeve 212*b* is engaged with the seventh gear 211*d*, the preceding transmission portion 2 and the clutch portion 3 may perform shifting from the seventh step into the sixth step.

Subsequently, when the preceding transmission portion 2 and the clutch portion 3 perform shifting from the seventh step into the eighth step, the second high-step sleeve 222*b* may be engaged with the eighth gear 221*d* while the first clutch unit 31 outputs driving transmitted from the seventh gear 211*d*, the first high-step sleeve 212*b*, and the first preceding transmission shaft 213 to the second transmission portion 20. Accordingly, the driving transmitted from the engine 10 may be transmitted to the second clutch unit 32 via the preceding transmission input shaft 232, the fourth preceding transmission input gear 231*d*, the eighth gear 221*d*, the second high-step sleeve 222*b*, and the second preceding transmission shaft 223. In this case, since the third frictional members 321 and the fourth frictional members 322 are spaced apart from each other, the second clutch unit 32 does not output the driving transmitted from the second preceding transmission shaft 223 to the second transmission portion 20.

While the first high-step sleeve 212*b* is engaged with the seventh gear 211*d* and the second high-step sleeve 222*b* is engaged with the eighth gear 221*d* as described above, the first frictional members 311 and the second frictional members 312 of the first clutch unit 31 may be spaced apart from each other and the third frictional members 321 and the fourth frictional members 322 of the second clutch unit 32 may come into contact with each other. Accordingly, as shown by a dotted line in FIG. 8, the second clutch unit 32 outputs driving transmitted from the eighth gear 221*d*, the second high-step sleeve 222*b*, and the second preceding transmission shaft 223 to the second transmission portion 20. In this case, the first clutch unit 31 does not output the driving transmitted from the first preceding transmission shaft 213 to the second transmission portion 20. Accordingly, while maintaining a state in which the first high-step sleeve 212b is engaged with the seventh gear 211d and the second high-step sleeve 222b is engaged with the eighth gear 221d, the preceding transmission portion 2 and the clutch portion 3 may perform shifting from the seventh step into the eighth step.

Meanwhile, while the first high-step sleeve 212b is engaged with the seventh gear 211d and the second high-step sleeve 222b is engaged with the eighth gear 221d, the first frictional members 311 and the second frictional members 312 of the first clutch unit 31 may come into contact with each other and the third frictional members 321 and the fourth frictional members 322 of the second clutch unit 32 may be spaced apart from each other. Accordingly, while maintaining a state in which the first high-step sleeve 212b is engaged with the seventh gear 211d and the second high-step sleeve 222b is engaged with the eighth gear 221d, the preceding transmission portion 2 and the clutch portion 3 may perform shifting from the eighth step into the seventh step.

Although it has been described above that shifting is sequentially performed so that the number of shifting steps is gradually increased or decreased by one step, the present disclosure is not limited thereto. The preceding transmission portion 2 and the clutch portion 3 may perform shifting so as to increase or decrease the number of shifting steps by (2N−1) steps (here, N is an integer greater than 1). That is, the preceding transmission portion 2 may perform shifting from a step on which output is performed by the first clutch unit 31 into a step on which output is performed by the second clutch unit 32 or from a step on which output is performed by the second clutch unit 32 into a step on which output is performed by the first clutch unit 31.

As described above, the preceding transmission portion 2 and the clutch portion 3 may perform shifting by eight steps. Although not shown in the drawings, the preceding transmission portion 2 and the clutch portion 3 may be implemented to perform shifting by an even step number such as the fourth step, the sixth step, and the like. The preceding transmission portion 2 and the clutch portion 3 may be implemented to perform shifting by an odd step number such as the third step, the fifth step, the seventh step, and the like.

Figure 9:
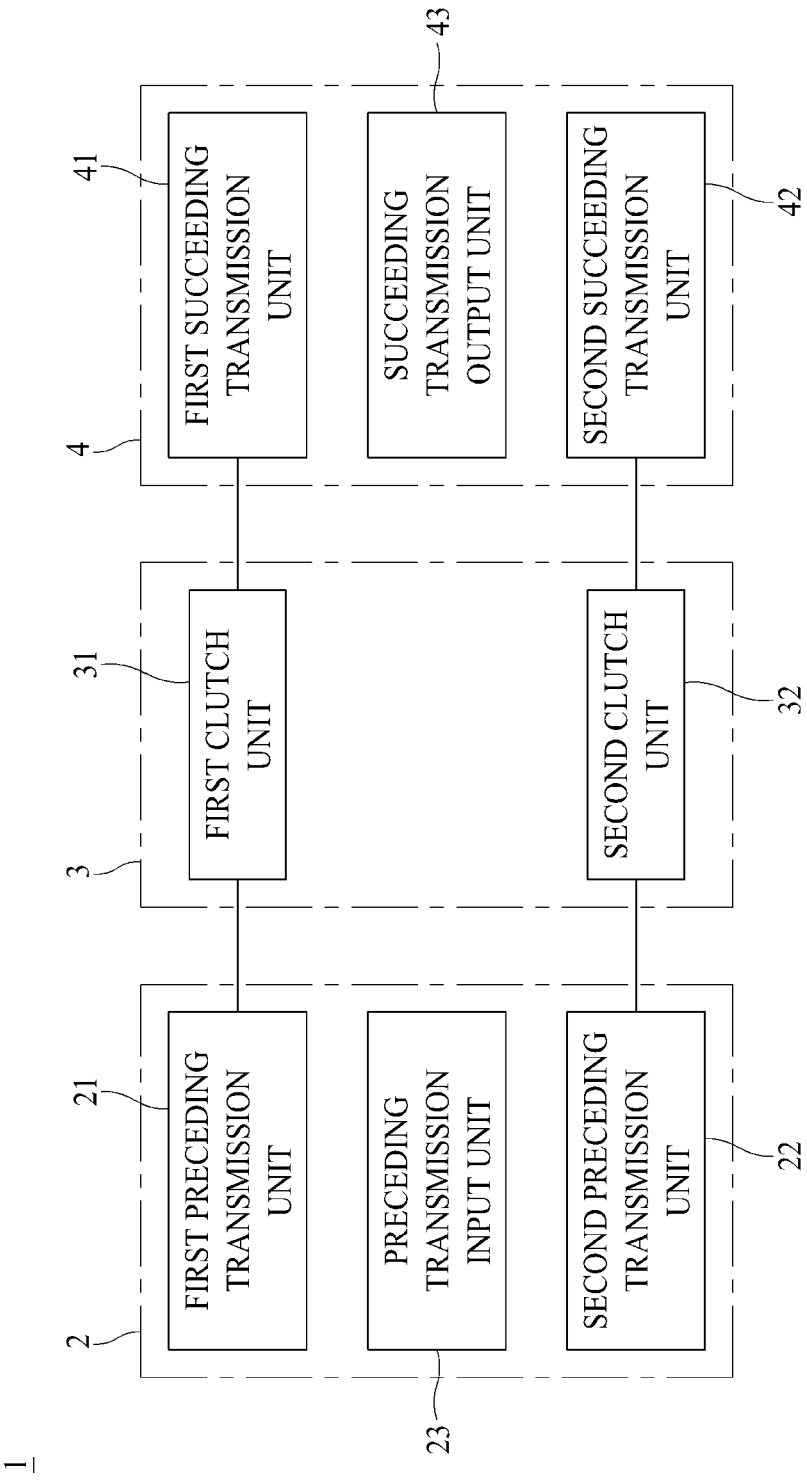
FIG. 9 is a schematic block diagram illustrating a preceding transmission portion, a clutch portion, and a succeeding transmission portion in the transmission of the agricultural working vehicle according to the present disclosure.
Figure 10:
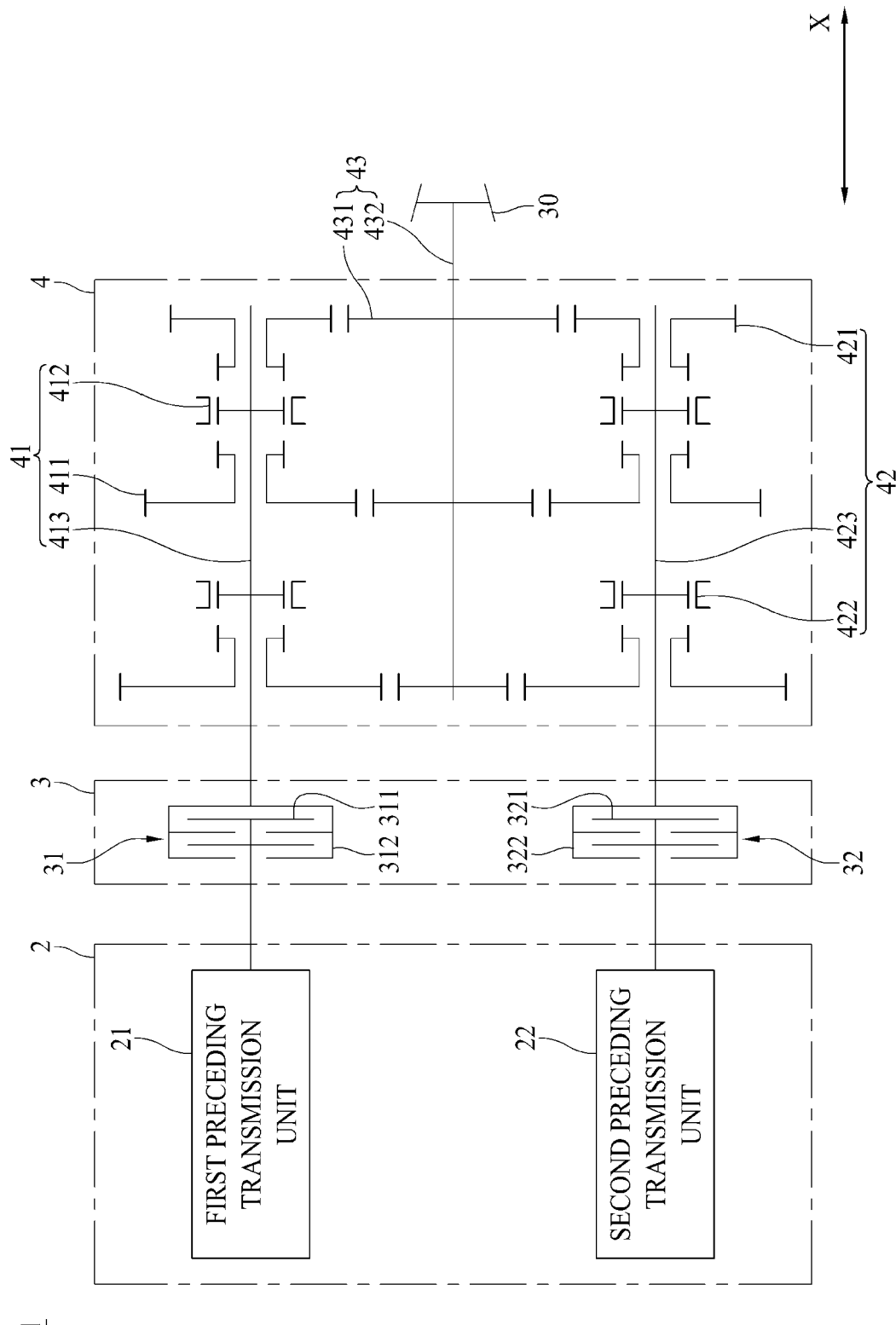
FIGS. 10 to 13 are schematic power transmission diagrams illustrating the clutch portion and the succeeding transmission portion in the transmission of the agricultural working vehicle according to the present disclosure.

Referring to FIGS. 9 and 10, the transmission 1 of the agricultural working vehicle according to the present disclosure may include a succeeding transmission portion 4.

The succeeding transmission portion 4 is configured to perform shifting with respect to the driving transmitted from the clutch portion 3. The succeeding transmission portion 4 may be included in the second transmission portion 20. The succeeding transmission portion 4 may be connected to the axle. The succeeding transmission portion 4 may be directly connected to the axle or may be connected to the axle through another transmission portion included in the second transmission portion 20.

The succeeding transmission portion 4 may be implemented as a main transmission portion or a subsidiary transmission portion. Hereinafter, an embodiment in which the succeeding transmission portion 4 is implemented as a subsidiary transmission portion will be described as an example.

The succeeding transmission portion 4 may include a first succeeding transmission unit 41 and a second succeeding transmission unit 42.

The first succeeding transmission unit 41 is configured to perform shifting with respect to driving transmitted from the first clutch unit 31. The first succeeding transmission unit 41 may be connected to the first clutch unit 31. When the first clutch unit 31 outputs the driving transmitted from the first preceding transmission unit 21, the first clutch unit 31 may output the driving to the first succeeding transmission unit 41.

The first succeeding transmission unit 41 may include a plurality of first succeeding transmission gears 411, a first succeeding transmission sleeve 412, and a first succeeding transmission shaft 413.

The first succeeding transmission gears 411 may be coupled to the first succeeding transmission shaft 413 to be idly rotatable. Bearings (not shown) may be installed between the first succeeding transmission gears 411 and the first succeeding transmission shaft 413. The first succeeding transmission gears 411 may be arranged to be spaced apart from each other in the first axial direction (X-axis direction). The first succeeding transmission gears 411 may be formed to have different diameters.

The first succeeding transmission sleeve 412 is configured to be selectively engaged with the first succeeding transmission gears 411. The first succeeding transmission sleeve 412 may be disposed between the first succeeding transmission gears 411 on the basis of the first axial direction (X-axis direction). The first succeeding transmission sleeve 412 may be engaged with any one of the first succeeding transmission gears 411 so as to change to an engaged state. The first succeeding transmission sleeve 412 may be spaced apart from all of the first succeeding transmission gears 411 so as to change to a neutral state. The first succeeding transmission sleeve 412 may be coupled to the first succeeding transmission shaft 413. The first succeeding transmission sleeve 412 may be a synchronizer sleeve. The first succeeding transmission sleeve 412 may be moved by a third driving unit (not shown) to change to the engaged state or the neutral state. The third driving unit may be an actuator.

The first clutch unit 31 may be coupled to the first succeeding transmission shaft 413. When the first clutch unit 31 outputs the driving transmitted from the first preceding transmission unit 21, the first succeeding transmission shaft 413 may rotate due to the driving transmitted from the first clutch unit 31. Accordingly, when the first succeeding transmission sleeve 412 is engaged with any one of the first succeeding transmission gears 411, the first succeeding transmission shaft 413 may rotate the first succeeding transmission sleeve 412 and the first succeeding transmission gear 411 engaged with the first succeeding transmission sleeve 412 while rotating. When the first succeeding transmission sleeve 412 is spaced apart from all of the first succeeding transmission gears 411, even though the first succeeding transmission shaft 413 and the first succeeding transmission sleeve 412 rotate, the first succeeding transmission gears 411 do not rotate. The first succeeding transmission shaft 413 may be disposed to be parallel to the first axial direction (X-axis direction).

According to the number of shifting steps executable by the succeeding transmission portion 4, the first succeeding transmission unit 41 may include a plurality of such first succeeding transmission sleeves 412. In this case, the first succeeding transmission sleeves 412 may be engaged selectively with the first succeeding transmission gears 411 which differ from one another. When the plurality of first succeeding transmission sleeves 412 are provided, the first succeeding transmission unit 41 may include a plurality of such third driving units. The third driving units may move the first succeeding transmission sleeves 412 separately.

The second succeeding transmission unit 42 is configured to perform shifting with respect to driving transmitted from the second clutch unit 32. The second succeeding transmission unit 42 may be connected to the second clutch unit 32. When the second clutch unit 32 outputs the driving transmitted from the second preceding transmission unit 22, the second clutch unit 32 may output the driving to the second succeeding transmission unit 42.

The second succeeding transmission unit 42 may include a plurality of second succeeding transmission gears 421, a second succeeding transmission sleeve 422, and a second succeeding transmission shaft 423.

The second succeeding transmission gears 421 may be coupled to the second succeeding transmission shaft 423 to be idly rotatable. Bearings (not shown) may be installed between the second succeeding transmission gears 421 and the second succeeding transmission shaft 423. The second succeeding transmission gears 421 may be arranged to be spaced apart from each other in the first axial direction (X-axis direction). The second succeeding transmission gears 421 may be formed to have different diameters.

The second succeeding transmission sleeve 422 is configured to be selectively engaged with the second succeeding transmission gears 421. The second succeeding transmission sleeve 422 may be disposed between the second succeeding transmission gears 421 on the basis of the first axial direction (X-axis direction). The second succeeding transmission sleeve 422 may be engaged with any one of the second succeeding transmission gears 421 so as to change to an engaged state. The second succeeding transmission sleeve 422 may be spaced apart from all of the second succeeding transmission gears 421 so as to change to a neutral state. The second succeeding transmission sleeve 422 may be coupled to the second succeeding transmission shaft 423. The second succeeding transmission sleeve 422 may be a synchronizer sleeve. The second succeeding transmission sleeve 422 may be moved by a fourth driving unit (not shown) to change to the engaged state or the neutral state. The fourth driving unit may be an actuator.

The second clutch unit 32 may be coupled to the second succeeding transmission shaft 423. When the second clutch unit 32 outputs the driving transmitted from the second preceding transmission unit 22, the second succeeding transmission shaft 423 may rotate due to the driving transmitted from the second clutch unit 32. Accordingly, when the second succeeding transmission sleeve 422 is engaged with any one of the second succeeding transmission gears 421, the second succeeding transmission shaft 423 may rotate the second succeeding transmission sleeve 422 and the second succeeding transmission gear 421 engaged with the second succeeding transmission sleeve 422 while rotating. When the second succeeding transmission sleeve 422 is spaced apart from all of the second succeeding transmission gears 421, even though the second succeeding transmission shaft 423 and the second succeeding transmission sleeve 422 rotate, the second succeeding transmission gears 421 do not rotate. The second succeeding transmission shaft 423 may be disposed to be parallel to the first axial direction (X-axis direction).

According to the number of shifting steps executable by the succeeding transmission portion 4, the second succeeding transmission unit 42 may include a plurality of such second succeeding transmission sleeves 422. In this case, the second succeeding transmission sleeves 422 may be engaged selectively with the second succeeding transmission gears 421 which differ from one another. When the plurality of second succeeding transmission sleeves 422 are provided, the second succeeding transmission unit 42 may include a plurality of such fourth driving units. The fourth driving units may move the second succeeding transmission sleeves 422 separately.

The succeeding transmission portion 4 may include a succeeding transmission output unit 43.

The succeeding transmission output units 43 are configured to output driving transmitted from the first succeeding transmission unit 41 or the second succeeding transmission unit 42. The succeeding transmission output unit 43 may output the driving to the axle or may output the driving to another transmission portion of the second transmission portion 20.

The succeeding transmission output unit 43 may include a plurality of succeeding transmission output gears 431.

The succeeding transmission output gears 431 may be engaged with each of the first succeeding transmission gears 411 and the second succeeding transmission gears 421. The succeeding transmission output gears 431 may be coupled to a succeeding transmission output shaft 432. Accordingly, the succeeding transmission output gears 431 may rotate due to the driving transmitted from the first succeeding transmission unit 41 or the second succeeding transmission unit 42 and may rotate the succeeding transmission output shaft 432. Accordingly, the driving may be output through the succeeding transmission output shaft 432. The succeeding transmission output shaft 432 may be disposed to be parallel to the first axial direction (X-axis direction). The succeeding transmission output gears 431 may be arranged to be spaced apart from each other in the first axial direction (X-axis direction).

The succeeding transmission output gears 431 may be formed to have different diameters. Accordingly, shifting may be performed while driving is transmitted from the first succeeding transmission gears 411 or the second succeeding transmission gears 421 to the succeeding transmission output gears 431.

Any one of the first succeeding transmission gears 411 may be engaged with one side of each of the succeeding transmission output gears 431, and any one of the second succeeding transmission gears 421 may be engaged with the other side thereof. Accordingly, the succeeding transmission output gears 431 may rotate due to the first succeeding transmission gears 411 or the second succeeding transmission gears 421.

The first succeeding transmission gear 411 and the second succeeding transmission gear 421 which are engaged with each of the succeeding transmission output gears 431 may be formed to have the same diameter. Accordingly, a gear shifting rate at which the first succeeding transmission unit 41 and the succeeding transmission output unit 43 perform shifting with respect to driving transmitted from the first clutch unit 31 and a gear shifting rate at which the second succeeding transmission unit 42 and the succeeding transmission output unit 43 perform shifting with respect to driving transmitted from the second clutch unit 32 may be implemented to be the same when shifting is performed by the same number of shifting steps. In this case, since the driving transmitted from the first clutch unit 31 and the driving transmitted from the second clutch unit 32 is implemented to be transmitted to the succeeding transmission portion 4 while shifting is performed to differ from each other, the succeeding transmission output shaft 432 may output driving at different speeds according to which one of the first succeeding transmission unit 41 and the second succeeding transmission unit 42 the driving is transmitted from.

Accordingly, in the transmission 1 of the agricultural working vehicle according to the present disclosure, even when the first succeeding transmission unit 41 and the second succeeding transmission unit 42 are implemented to be same, driving may be implemented to be output at a different speed according to which one of the first succeeding transmission unit 41 and the second succeeding transmission unit 42 the driving is transmitted to. Accordingly, in the transmission 1 of the agricultural working vehicle according to the present disclosure, the first succeeding transmission unit 41 and the second succeeding transmission unit 42 may be shared or modularized. Accordingly, the transmission 1 of the agricultural working vehicle according to the present disclosure may assist in improving ease of manufacturing the first succeeding transmission unit 41 and the second succeeding transmission unit 42 and in reducing manufacturing costs.

The first succeeding transmission gear 411 and the second succeeding transmission gear 421 which are engaged with each of the succeeding transmission output gears 431 may be formed to have different diameters. Accordingly, a gear shifting rate at which the first succeeding transmission unit 41 and the succeeding transmission output unit 43 perform shifting with respect to driving transmitted from the first clutch unit 31 and a gear shifting rate at which the second succeeding transmission unit 42 and the succeeding transmission output unit 43 perform shifting with respect to driving transmitted from the second clutch unit 32 may be implemented to be different even when shifting is performed by the same number of shifting steps. In this case, even when the driving transmitted from the first clutch unit 31 and the driving transmitted from the second clutch unit 32 are implemented to be transmitted to the succeeding transmission portion 4 while shifting is performed to be equal to each other, the succeeding transmission output shaft 432 may output driving at different speeds according to which one of the first succeeding transmission unit 41 and the second succeeding transmission unit 42 the driving is transmitted from.

Accordingly, in the transmission 1 of the agricultural working vehicle according to the present disclosure, even when the first preceding transmission unit 21 and the second preceding transmission unit 22 are implemented to be same, driving may be implemented to be output at a different speed according to which one of the first succeeding transmission unit 41 and the second succeeding transmission unit 42 the driving is transmitted through. Accordingly, in the transmission 1 of the agricultural working vehicle according to the present disclosure, the first preceding transmission unit 21 and the second preceding transmission unit 22 may be shared or modularized. Accordingly, the transmission 1 of the agricultural working vehicle according to the present disclosure may assist in improving ease of manufacturing the first preceding transmission unit 21 and the second preceding transmission unit 22 and in reducing manufacturing costs.

Figure 11:
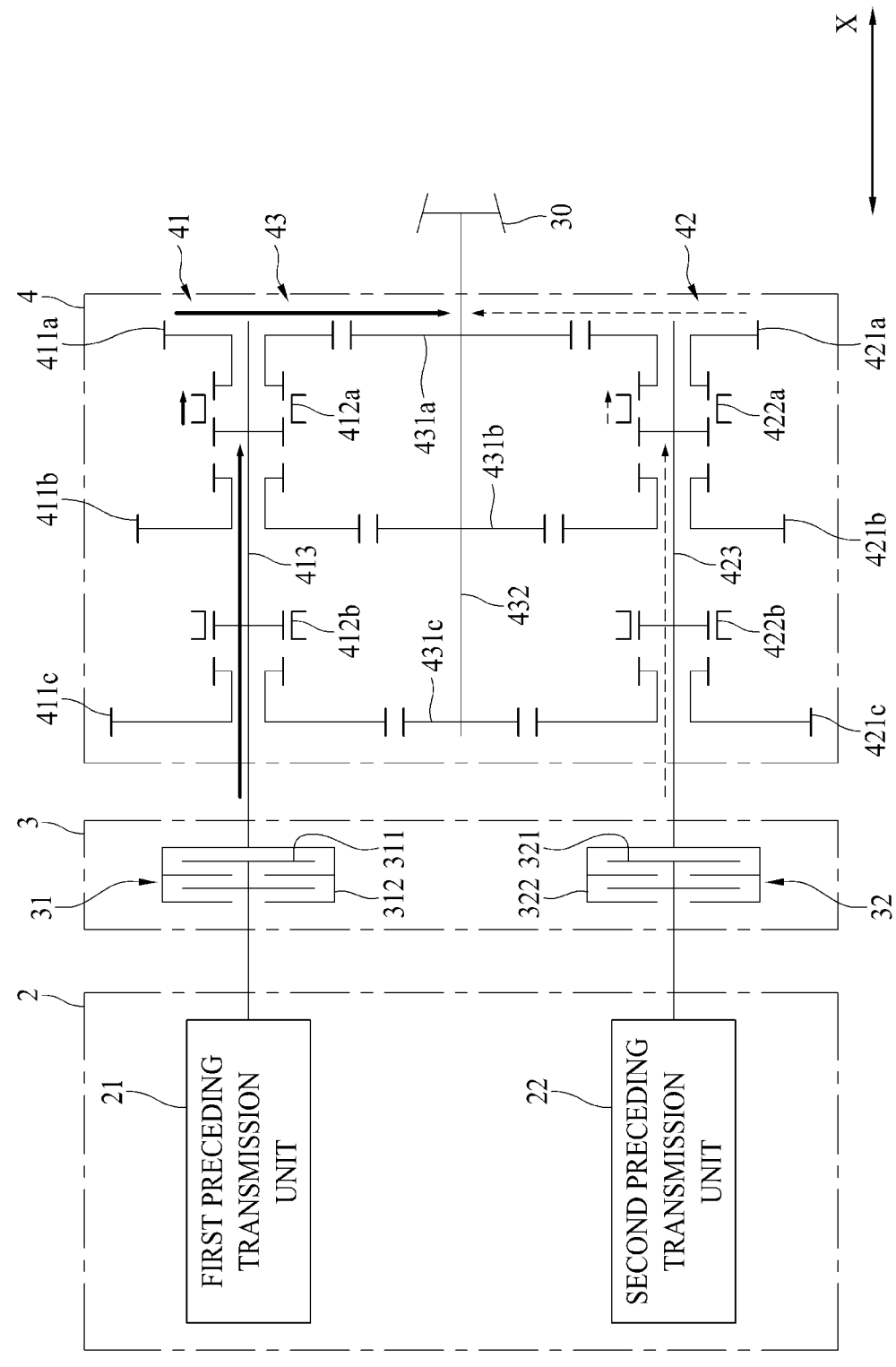
Figure 12:
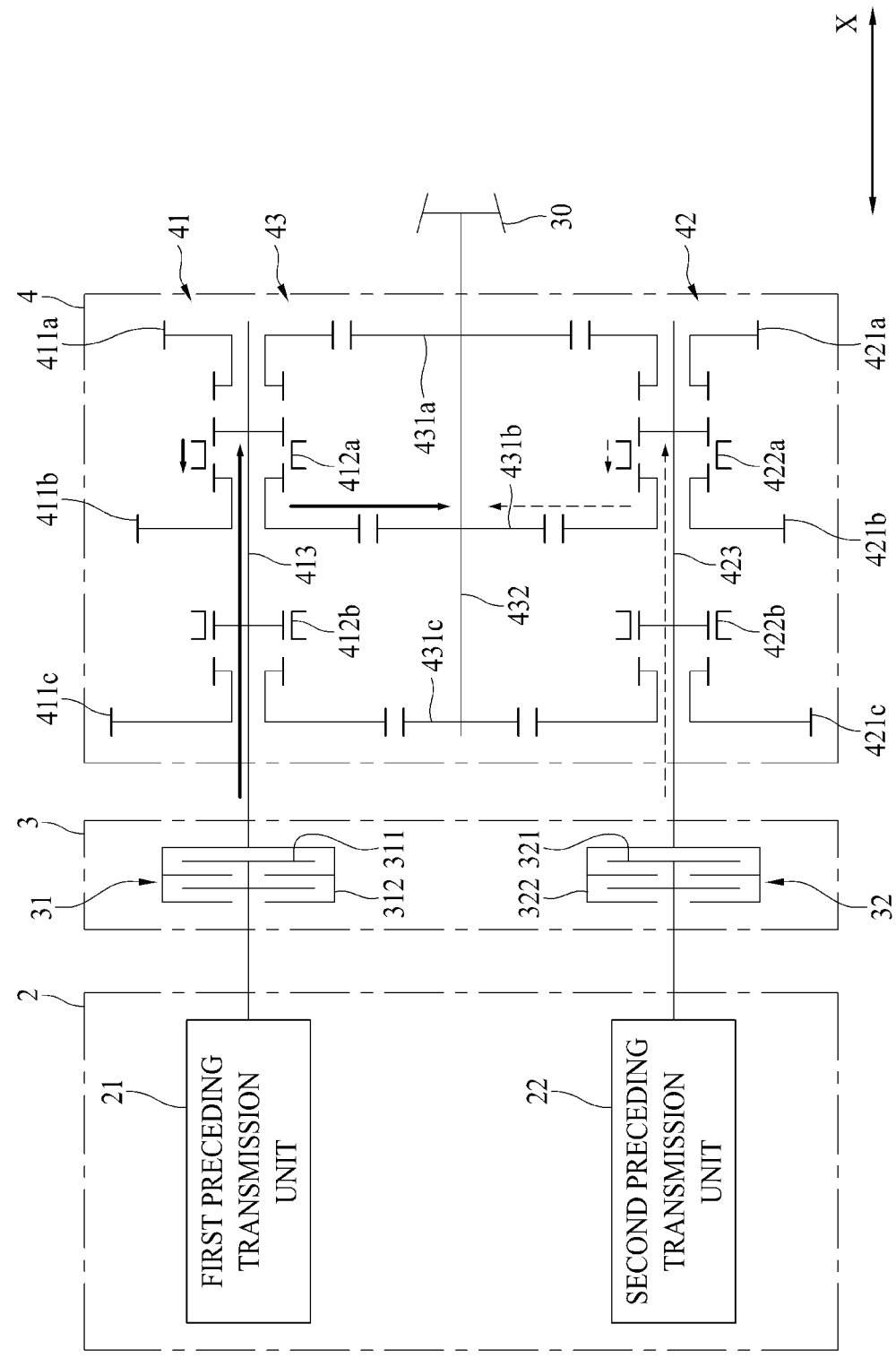
Figure 13:
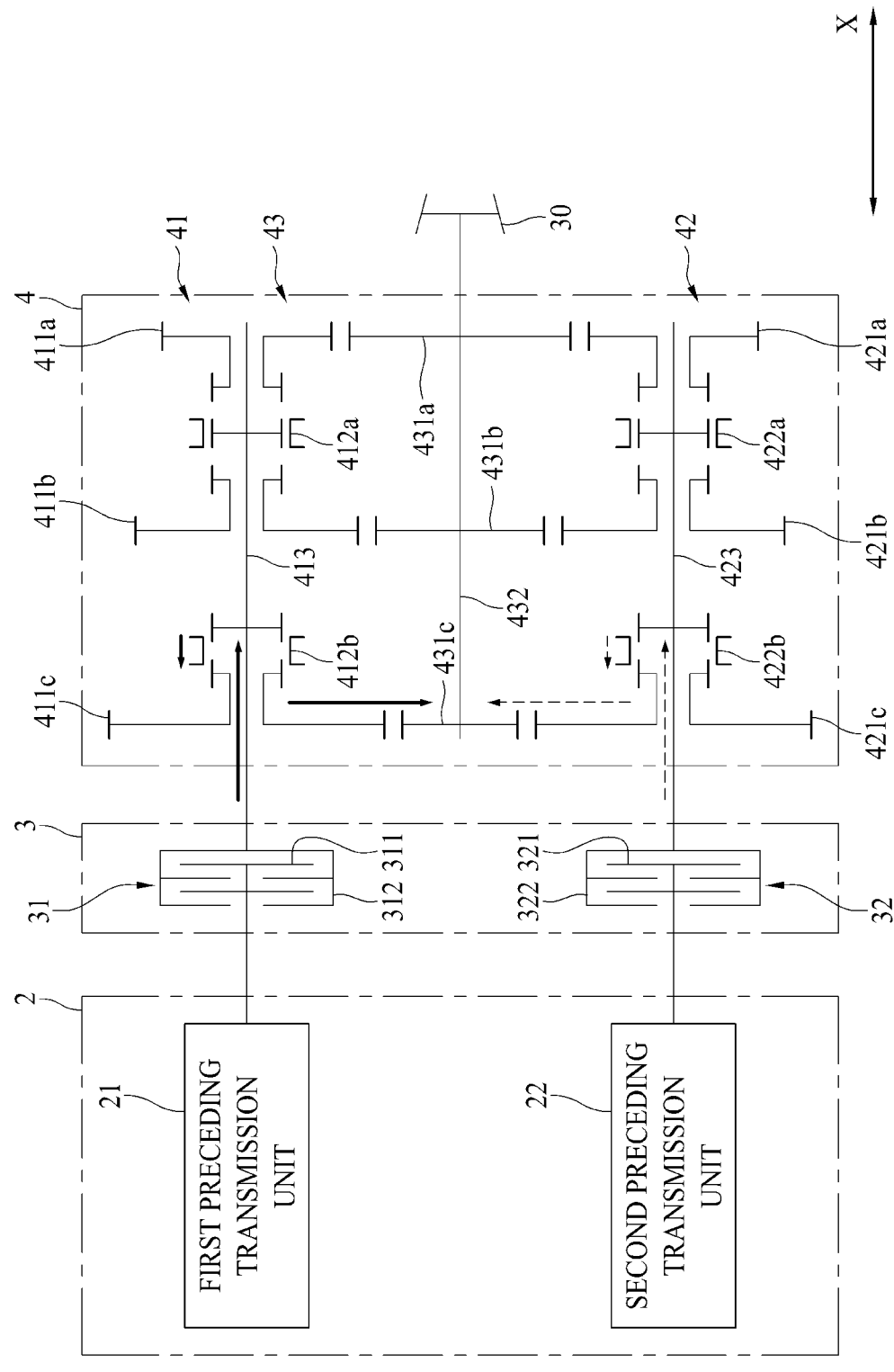

Referring to FIGS. 11 to 13, the succeeding transmission portion 4 may be implemented to perform three steps of shifting. In this case, the first succeeding transmission unit 41, the second succeeding transmission unit 42, and the succeeding transmission output unit 43 may be implemented as follows.

First, the first succeeding transmission unit 41 may include a first succeeding transmission gear 411a (hereinafter, referred to as a first low gear 411a) corresponding to a low step, a first succeeding transmission gear 411b (hereinafter, referred to as a first middle gear 411b) corresponding to a middle step, a first succeeding transmission gear 411c (hereinafter, referred to as a high gear 411c) corresponding to a high step, a first succeeding transmission sleeve 412a (hereinafter, referred to as a low-speed sleeve 412a) selectively engaged with the first low gear 411a and the first middle gear 411b, and a first succeeding transmission sleeve 412b (hereinafter, referred to as a high-speed sleeve 412b) selectively engaged with the first high gear 411c. When arranged in order from a large diameter to a small diameter, the first high gear 411c, the first middle gear 411b, and the first low gear 411a may be sequentially arranged. The first high gear 411c, the first middle gear 411b, and the first low gear 411a may be spaced apart from one another in the first axial direction (X-axis direction) and coupled to the first succeeding transmission shaft 413 to be idly rotatable. The first low-speed sleeve 412a and the first high-speed sleeve 412b may be coupled to the first succeeding transmission shaft 413 to rotate with the first succeeding transmission shaft 413 together. The first succeeding transmission unit 41 may perform shifting into a first low step through the first low gear 411a and the first low-speed sleeve 412a, into a first middle step through the first middle gear 411b and the first low-speed sleeve 412a, and into a first high step through the first high gear 411c and the first high-speed sleeve 412b.

Next, the second succeeding transmission unit 42 may include a second succeeding transmission gear 421a (hereinafter, referred to as a second low gear 421a) corresponding to a low step, a second succeeding transmission gear 421b (hereinafter, referred to as a second middle gear 421b) corresponding to a middle step, a second succeeding transmission gear 421c (hereinafter, referred to as a high gear 421c) corresponding to a high step, a second succeeding transmission sleeve 422a (hereinafter, referred to as a low-speed sleeve 422a) selectively engaged with the second low gear 421a and the second middle gear 421b, and a second succeeding transmission sleeve 422b (hereinafter, referred to as a high-speed sleeve 422b) selectively engaged with the second high gear 421c. When arranged in order from a large diameter to a small diameter, the second high gear 421c, the second middle gear 421b, and the second low gear 421a may be sequentially arranged. The second high gear 421c, the second middle gear 421b, and the second low gear 421a may be spaced apart from one another in the first axial direction (X-axis direction) and coupled to the second succeeding transmission shaft 423 to be idly rotatable. The second low-speed sleeve 422a and the second high-speed sleeve 422b may be coupled to the second succeeding transmission shaft 423 to rotate with the second succeeding transmission shaft 423 together. The second succeeding transmission unit 42 may perform shifting into a second low step through the second low gear 421a and the second low-speed sleeve 422a, into a second middle step through the second middle gear 421b and the second low-speed sleeve 422a, and into a second high step through the second high gear 421c and the second high-speed sleeve 422b.

Subsequently, the succeeding transmission output unit 43 may include a first succeeding transmission output gear 431a engaged with each of the first low gear 411a and the second low gear 421a, a second succeeding transmission output gear 431b engaged with each of the first middle gear 411b and the second middle gear 421b, and a third succeeding transmission output gear 431c engaged with each of the first high gear 411c and the second high gear 421c. When arranged in order from a large diameter to a small diameter, the first succeeding transmission output gear 431a, the second succeeding transmission output gear 431b, and the third succeeding transmission output gear 431c may be sequentially arranged. Accordingly, driving may be maximally reduced in speed while being transmitted from the first low gear 411a or the second low gear 421a to the first succeeding transmission output gear 431a. Driving may be minimally reduced in speed while being transmitted from the first high gear 411c or the second high gear 421c to the third succeeding transmission output gear 431c. The first succeeding transmission output gear 431a, the second succeeding transmission output gear 431b, and the third succeeding transmission output gear 431c may be disposed to be spaced apart from one another in the first axial direction (X-axis direction). The first succeeding transmission output gear 431a, the second succeeding transmission output gear 431b, and the third succeeding transmission output gear 431c may be coupled to the succeeding transmission output shaft 432 to rotate with the succeeding transmission output shaft 432 together.

The succeeding transmission portion 4 implemented as described above may perform shifting by three steps as follows.

The first clutch unit 31 selectively outputs the driving transmitted from the first preceding transmission unit 21 to the first succeeding transmission unit 41. In this case, the first clutch unit 31 may selectively output driving in which shifting is performed by the first preceding transmission unit 21 into any one of the first step, third step, fifth step, and seventh step to the first succeeding transmission unit 41. The second clutch unit 32 selectively outputs the driving transmitted from the second preceding transmission unit 22 to the second succeeding transmission unit 42. In this case, the second clutch unit 32 may selectively output driving in which shifting is performed by the second preceding transmission unit 22 into any one of the second step, fourth step, sixth step, and eighth step to the second succeeding transmission unit 42. With respect to the driving transmitted through the preceding transmission portion 2 and the clutch portion 3 as described above, the succeeding transmission portion 4 may perform shifting as follows.

First, when the succeeding transmission portion 4 performs shifting into the first low step, as shown in FIG. 11, the first low-speed sleeve 412a is engaged with the first low gear 411a. In this case, the first high-speed sleeve 412b is being spaced apart from the first high gear 411c. In this condition, the first clutch unit 31 outputs the driving transmitted from the first preceding transmission unit 21 to the first succeeding transmission unit 41 as the first frictional members 311 come into contact with the second frictional members 312. Accordingly, as a solid line shown in FIG. 11, the driving transmitted from the first clutch unit 31 to the first succeeding transmission unit 41 may be transmitted to a distribution gear 30 via the first succeeding transmission shaft 413, the first low-speed sleeve 412a, the first low gear 411a, the first succeeding transmission output gear 431a, and the succeeding transmission output shaft 432. In this case, since the third frictional members 321 and the fourth frictional members 322 of the second clutch unit 32 are spaced apart from each other, the driving is not transmitted to the second succeeding transmission unit 42. Accordingly, the succeeding transmission portion 4 may perform shifting into the first low step.

Next, when the succeeding transmission portion 4 performs shifting from the first low step into the second low step, while the first clutch unit 31 outputs the driving transmitted from the first preceding transmission unit 21 to the first succeeding transmission unit 41, the second low-speed sleeve 422a may be engaged with the second low gear 421a as shown in FIG. 11. In this case, the second high-speed sleeve 422b is spaced apart from the second high gear 421c. The first low-speed sleeve 412a is engaged with the first low gear 411a.

While the first low-speed sleeve 412a is engaged with the first low gear 411a and the second low-speed sleeve 422a is engaged with the second low gear 421a as described above, the first frictional members 311 and the second frictional members 312 of the first clutch unit 31 may be spaced apart from each other and the third frictional members 321 and the fourth frictional members 322 of the second clutch unit 32 may come into contact with each other. Accordingly, as shown by a dotted line in FIG. 11, the driving transmitted from the second clutch unit 32 to the second succeeding transmission unit 42 may be transmitted to the distribution gear 30 via the second succeeding transmission shaft 423, the second low-speed sleeve 422a, the second low gear 421a, the first succeeding transmission output gear 431a, and the succeeding transmission output shaft 432. Accordingly, while maintaining a state in which the first low-speed sleeve 412a is engaged with the first low gear 411a and the second low-speed sleeve 422a is engaged with the second low gear 421a, the succeeding transmission portion 4 may perform shifting from the first low step into the second low step.

Meanwhile, while the first low-speed sleeve 412a is engaged with the first low gear 411a and the second low-speed sleeve 422a is engaged with the second low gear 421a, the first frictional members 311 and the second frictional members 312 of the first clutch unit 31 may come into contact with each other and the third frictional members 321 and the fourth frictional members 322 of the second clutch unit 32 may be spaced apart from each other. Accordingly, while maintaining a state in which the first low-speed sleeve 412a is engaged with the first low gear 411a and the second low-speed sleeve 422a is engaged with the second low gear 421a, the succeeding transmission portion 4 may perform shifting from the second low step into the first low step.

Next, when the succeeding transmission portion 4 performs shifting from the second low step into the first middle step, while the second clutch unit 32 outputs the driving transmitted from the second preceding transmission unit 22 to the second succeeding transmission unit 42, the first low-speed sleeve 412a may be engaged with the first middle gear 411b as shown in FIG. 12. In this case, the first high-speed sleeve 412b is spaced apart from the first high gear 411c. The second low-speed sleeve 422a is engaged with the second low gear 421a.

While the second low-speed sleeve 422a is engaged with the second low gear 421a and the first low-speed sleeve 412a is engaged with the first middle gear 411b as described above, the third frictional members 321 and the fourth frictional members 322 of the second clutch unit 32 may be spaced apart from each other and the first frictional members 311 and the second frictional members 312 of the first clutch unit 31 may come into contact with each other. Accordingly, as a solid line shown in FIG. 12, the driving transmitted from the first clutch unit 31 to the first succeeding transmission unit 41 may be transmitted to the distribution gear 30 via the first succeeding transmission shaft 413, the first low-speed sleeve 412a, the first middle gear 411b, the second succeeding transmission output gear 431b, and the succeeding transmission output shaft 432. Accordingly, while maintaining a state in which the second low-speed sleeve 422a is engaged with the second low gear 421*a* and the first low-speed sleeve 412*a* is engaged with the first middle gear 411*b*, the succeeding transmission portion 4 may perform shifting from the second low step into the first middle step.

Meanwhile, while the second low-speed sleeve 422*a* is engaged with the second low gear 421*a* and the first low-speed sleeve 412*a* is engaged with the first middle gear 411*b*, the first frictional members 311 and the second frictional members 312 of the first clutch unit 31 may be spaced apart from each other and the third frictional members 321 and the fourth frictional members 322 of the second clutch unit 32 may come into contact with each other. Accordingly, while maintaining a state in which the second low-speed sleeve 422*a* is engaged with the second low gear 421*a* and the first low-speed sleeve 412*a* is engaged with the first middle gear 411*b*, the succeeding transmission portion 4 may perform shifting from the first middle step into the second low step.

Also, in a state in which the first low-speed sleeve 412*a* is engaged with the first low gear 411*a* and the second low-speed sleeve 422*a* is engaged with the second middle gear 421*b*, the succeeding transmission portion 4 may perform shifting between the first low step and the second middle step. In this case, since the first frictional members 311 and the second frictional members 312 of the first clutch unit 31 are spaced apart from each other and the third frictional members 321 and the fourth frictional members 322 of the second clutch unit 32 come into contact with each other, the succeeding transmission portion 4 may perform shifting from the first low step into the second middle step. As the third frictional members 321 and the fourth frictional members 322 of the second clutch unit 32 are spaced apart from each other and the first frictional members 311 and the second frictional members 312 of the first clutch unit 31 come into contact with each other, the succeeding transmission portion 4 may perform shifting from the second middle step into the first low step.

Next, when the succeeding transmission portion 4 performs shifting from the first middle step into the second middle step, while the first clutch unit 31 outputs the driving transmitted from the first preceding transmission unit 21 to the first succeeding transmission unit 41, the second low-speed sleeve 422*a* may be engaged with the second middle gear 421*b* as shown in FIG. 12. In this case, the second high-speed sleeve 422*b* is spaced apart from the second high gear 421*c*. The first low-speed sleeve 412*a* is engaged with the first middle gear 411*b*.

While the first low-speed sleeve 412*a* is engaged with the first middle gear 411*b* and the second low-speed sleeve 422*a* is engaged with the second middle gear 421*b* as described above, the first frictional members 311 and the second frictional members 312 of the first clutch unit 31 may be spaced apart from each other and the third frictional members 321 and the fourth frictional members 322 of the second clutch unit 32 may come into contact with each other. Accordingly, as shown by a dotted line in FIG. 12, the driving transmitted from the second clutch unit 32 to the second succeeding transmission unit 42 may be transmitted to the distribution gear 30 via the second succeeding transmission shaft 423, the second low-speed sleeve 422*a*, the second middle gear 421*b*, the second succeeding transmission output gear 431*b*, and the succeeding transmission output shaft 432. Accordingly, while maintaining a state in which the first low-speed sleeve 412*a* is engaged with the first middle gear 411*b* and the second low-speed sleeve 422*a* is engaged with the second middle gear 421*b*, the succeeding transmission portion 4 may perform shifting from the first middle step into the second middle step.

Meanwhile, while the first low-speed sleeve 412*a* is engaged with the first middle gear 411*b* and the second low-speed sleeve 422*a* is engaged with the second middle gear 421*b*, the first frictional members 311 and the second frictional members 312 of the first clutch unit 31 may come into contact with each other and the third frictional members 321 and the fourth frictional members 322 of the second clutch unit 32 may be spaced apart from each other. Accordingly, while maintaining a state in which the first low-speed sleeve 412*a* is engaged with the first middle gear 411*b* and the second low-speed sleeve 422*a* is engaged with the second middle gear 421*b*, the succeeding transmission portion 4 may perform shifting from the second middle step into the first middle step.

Next, when the succeeding transmission portion 4 performs shifting from the second middle step into the first high step, while the second clutch unit 32 outputs the driving transmitted from the second preceding transmission unit 22 to the second succeeding transmission unit 42, the first high-speed sleeve 412*b* may be engaged with the first high gear 411*c* as shown in FIG. 13. In this case, the first low-speed sleeve 412*a* is being spaced apart from both the first low gear 411*a* and the first middle gear 411*b*. The second low-speed sleeve 422*a* is being engaged with the second middle gear 421*b*.

While the second low-speed sleeve 422*a* is engaged with the second middle gear 421*b* and the first high-speed sleeve 412*b* is engaged with the first high gear 411*c* as described above, the third frictional members 321 and the fourth frictional members 322 of the second clutch unit 32 may be spaced apart from each other and the first frictional members 311 and the second frictional members 312 of the first clutch unit 31 may come into contact with each other. Accordingly, as a solid line shown in FIG. 13, the driving transmitted from the first clutch unit 31 to the first succeeding transmission unit 41 may be transmitted to the distribution gear 30 via the first succeeding transmission shaft 413, the first high-speed sleeve 412*b*, the first high gear 411*c*, the third succeeding transmission output gear 431*c*, and the succeeding transmission output shaft 432. Accordingly, while maintaining a state in which the second low-speed sleeve 422*a* is engaged with the second middle gear 421*b* and the first high-speed sleeve 412*b* is engaged with the first high gear 411*c*, the succeeding transmission portion 4 may perform shifting from the second middle step into the first high step.

Meanwhile, while the second low-speed sleeve 422*a* is engaged with the second middle gear 421*b* and the first high-speed sleeve 412*b* is engaged with the first high gear 411*c*, the first frictional members 311 and the second frictional members 312 of the first clutch unit 31 may be spaced apart from each other and the third frictional members 321 and the fourth frictional members 322 of the second clutch unit 32 may come into contact with each other. Accordingly, while maintaining a state in which the second low-speed sleeve 422*a* is engaged with the second middle gear 421*b* and the first high-speed sleeve 412*b* is engaged with the first high gear 411*c*, the succeeding transmission portion 4 may perform shifting from the first high step into the second middle step.

Also, in a state in which the first low-speed sleeve 412*a* is engaged with the first middle gear 411*b* and the second high-speed sleeve 422*b* is engaged with the second high gear 421*c*, the succeeding transmission portion 4 may perform shifting between the first middle step and the second high step. In this case, since the first frictional members 311 and the second frictional members 312 of the first clutch unit 31 are spaced apart from each other and the third frictional members 321 and the fourth frictional members 322 of the second clutch unit 32 come into contact with each other, the succeeding transmission portion 4 may perform shifting from the first middle step into the second high step. As the third frictional members 321 and the fourth frictional members 322 of the second clutch unit 32 are spaced apart from each other and the first frictional members 311 and the second frictional members 312 of the first clutch unit 31 come into contact with each other, the succeeding transmission portion 4 may perform shifting from the second high step into the first middle step.

Next, when the succeeding transmission portion 4 performs shifting from the first high step into the second high step, while the first clutch unit 31 outputs the driving transmitted from the first preceding transmission unit 21 to the first succeeding transmission unit 41, the second high-speed sleeve 422b may be engaged with the second high gear 421c as shown in FIG. 12. In this case, the second low-speed sleeve 422a is spaced apart from both the second low gear 421a and the second middle gear 421b. The first high-speed sleeve 412b is engaged with the first high gear 411c.

While the first high-speed sleeve 412b is engaged with the first high gear 411c and the second high-speed sleeve 422b is engaged with the second high gear 421c as described above, the first frictional members 311 and the second frictional members 312 of the first clutch unit 31 may be spaced apart from each other and the third frictional members 321 and the fourth frictional members 322 of the second clutch unit 32 may come into contact with each other. Accordingly, as shown by a dotted line in FIG. 13, the driving transmitted from the second clutch unit 32 to the second succeeding transmission unit 42 may be transmitted to the distribution gear 30 via the second succeeding transmission shaft 423, the second high-speed sleeve 422b, the second high gear 421c, the third succeeding transmission output gear 431c, and the succeeding transmission output shaft 432. Accordingly, while maintaining a state in which the first high-speed sleeve 412b is engaged with the first high gear 411c and the second high-speed sleeve 422b is engaged with the second high gear 421c, the succeeding transmission portion 4 may perform shifting from the first high step into the second high step.

Meanwhile, while the first high-speed sleeve 412b is engaged with the first high gear 411c and the second high-speed sleeve 422b is engaged with the second high gear 421c, the first frictional members 311 and the second frictional members 312 of the first clutch unit 31 may come into contact with each other and the third frictional members 321 and the fourth frictional members 322 of the second clutch unit 32 may be spaced apart from each other. Accordingly, while maintaining a state in which the first high-speed sleeve 412b is engaged with the first high gear 411c and the second high-speed sleeve 422b is engaged with the second high gear 421c, the succeeding transmission portion 4 may perform shifting from the second high step into the first high step.

Although the succeeding transmission portion 4 has been described above as sequentially performing shifting among the low step, the middle step, and the high step, the present disclosure is not limited thereto and the succeeding transmission portion 4 may perform shifting from the low step into the high step without the middle step. In this case, the succeeding transmission portion 4 may perform shifting from a step on which output is performed by the first clutch unit 31 into a step on which output is performed by the second clutch unit 32 or from a step on which output is performed by the second clutch unit 32 into a step on which output is performed by the first clutch unit 31.

Meanwhile, when shifting is performed between the first succeeding transmission unit 41 and the second succeeding transmission unit 42, shifting may be performed between the first preceding transmission unit 21 and the second preceding transmission unit 22.

As described above, the succeeding transmission portion 4 may perform shifting by three steps. Although not shown in the drawings, the succeeding transmission portion 4 may be implemented to perform shifting by two steps. The succeeding transmission portion 4 may be implemented to perform shifting by four steps or more.

As described above, the succeeding transmission portion 4 may be implemented as a subsidiary transmission portion. Meanwhile, the succeeding transmission portion 4 may be implemented as a main transmission portion. Since an embodiment in which the succeeding transmission portion 4 is implemented as a main transmission portion is easily derivable from a description with respect to an embodiment in which the preceding transmission portion 2 is implemented as a main transmission portion, a detailed description thereof will be omitted. When the succeeding transmission portion 4 is implemented as a main transmission portion, the preceding transmission portion 2 may be implemented as a subsidiary transmission portion. Since an embodiment in which the preceding transmission portion 2 is implemented as a subsidiary transmission portion is easily derivable from a description with respect to an embodiment in which the succeeding transmission portion 4 is implemented as a subsidiary transmission portion, a detailed description thereof will be omitted.

Figure 14:
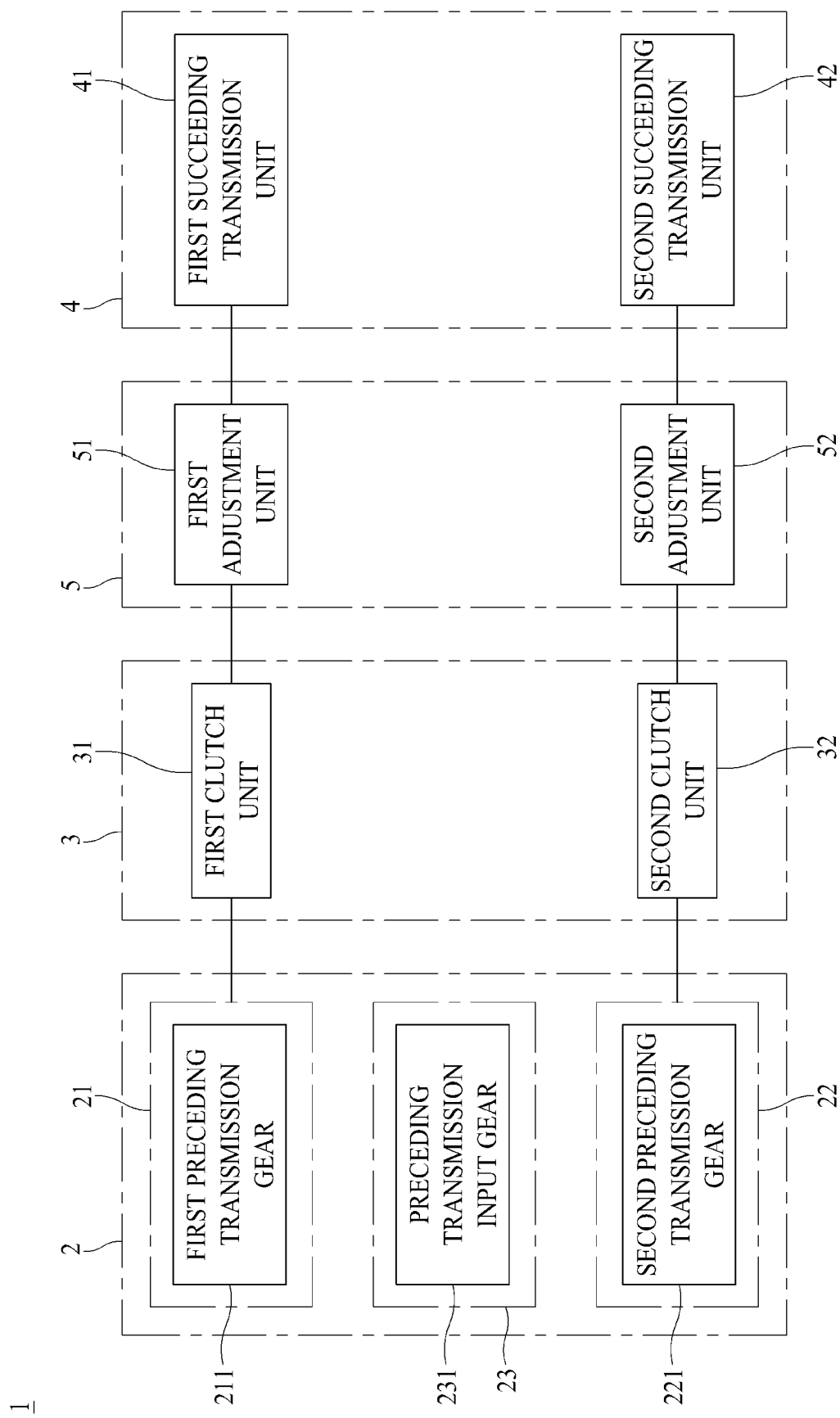
FIG. 14 is a schematic block diagram illustrating the preceding transmission portion, the clutch portion, an adjusting portion, and the succeeding transmission portion in the transmission of the agricultural working vehicle according to the present disclosure.

Referring to FIG. 14, the first preceding transmission unit 21 and the second preceding transmission unit 22 may be implemented to differ from each other. In this case, the first preceding transmission gear 211 and the second preceding transmission gear 221 which are engaged with each of the preceding transmission input gears 231 may be formed to have different diameters. Accordingly, since a gear shifting rate is implemented to be different depending on which one of the first preceding transmission unit 21 and the second preceding transmission unit 22 each of the preceding transmission input gears 231 outputs driving to, the preceding transmission portion 2 may implement a plurality of numbers of shifting steps.

Here, in the transmission 1 of the agricultural working vehicle according to the present disclosure, the first preceding transmission unit 21 and the second preceding transmission unit 22 may be implemented to perform shifting at the same gear shifting rate. In this case, the first preceding transmission unit 21 and the second preceding transmission unit 22 may be implemented to be equal to each other. Accordingly, in the transmission 1 of the agricultural working vehicle according to the present disclosure, the first preceding transmission unit 21 and the second preceding transmission unit 22 may be shared or modularized. When the first preceding transmission unit 21 and the second preceding transmission unit 22 are implemented to be equal to each other, the first preceding transmission gear 211 and the second preceding transmission gear 221 which are engaged with each of the preceding transmission input gears 231 may be formed to have the same diameter. For example, as shown in FIG. 3, when the preceding transmission portion 2 is implemented to perform shifting by eight steps, the first gear 211a and the second gear 221a may be formed to have the same diameter. The third gear 211b and the fourth gear 221*b* may be formed to have the same diameter. The fifth gear 211*c* and the sixth gear 221*c* may be formed to have the same diameter. The seventh gear 211*d* and the eighth gear 221*d* may be formed to have the same diameter. Accordingly, gear shifting rates may be implemented to be equal to each other even though each of the preceding transmission input gears 231 outputs driving through any one of the first preceding transmission unit 21 and the second preceding transmission unit 22. In this case, the transmission 1 of the agricultural working vehicle according to the present disclosure may include an adjustment portion 5.

Figure 15:
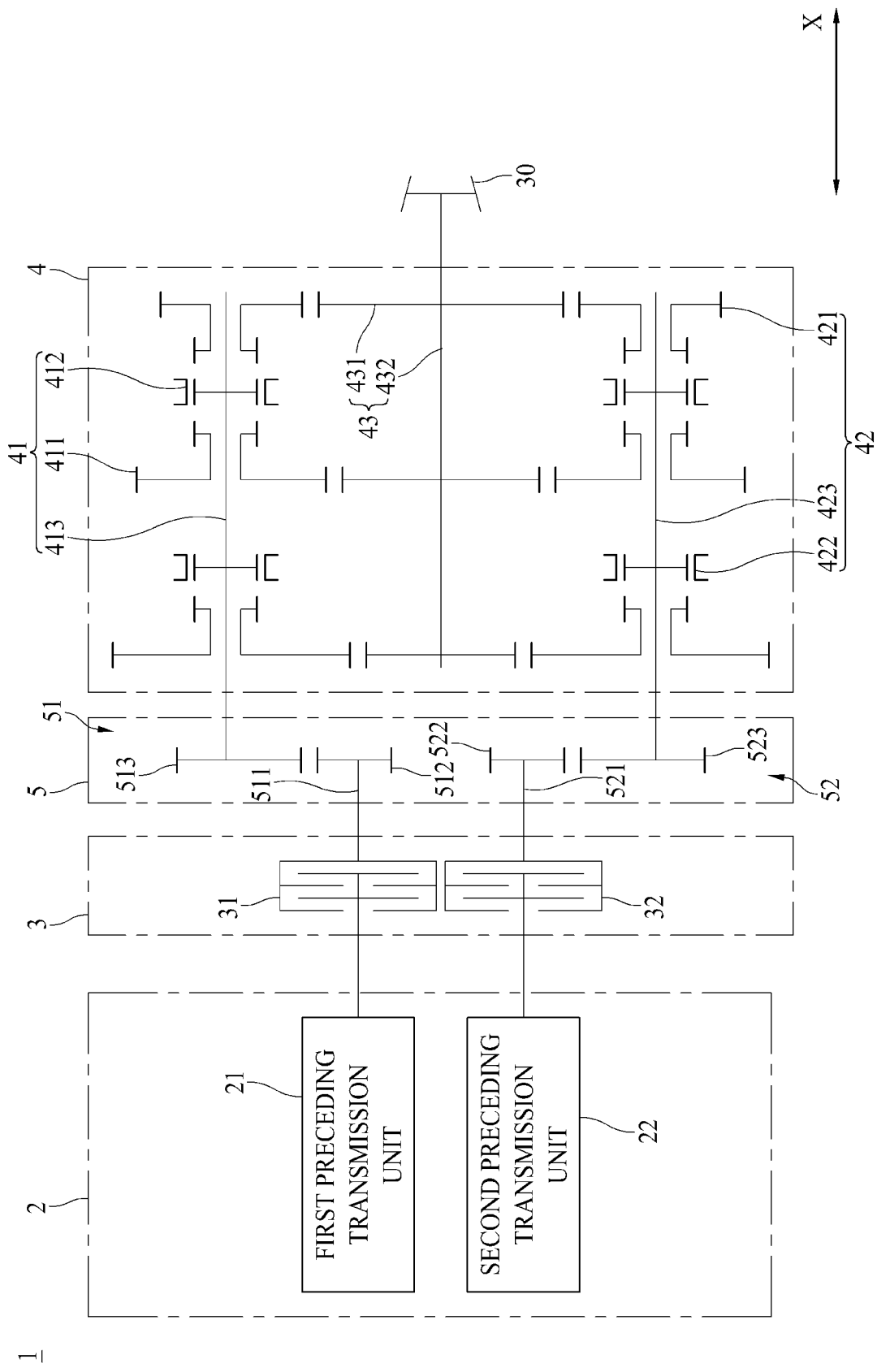
FIGS. 15 to 17 are schematic power transmission diagrams illustrating the clutch portion, the adjusting portion, and the succeeding transmission portion in the transmission of the agricultural working vehicle according to the present disclosure.

Referring to FIGS. 14 and 15, the adjustment portion 5 is configured to be connected to the clutch portion 3. The adjustment portion 5 may perform shifting with respect to the driving transmitted from the clutch portion 3 using a gear ratio. The adjustment portion 5 may adjust gear shifting rates to differ from each other depending on which one of the first preceding transmission unit 21 and the second preceding transmission unit 22 driving is output through. The adjustment portion 5 may be connected to each of the clutch portion 3 and the succeeding transmission portion 4. The adjustment portion 5 may perform shifting with respect to the driving transmitted from the clutch portion 3 using the gear ratio and then may output the shifted driving to the succeeding transmission portion 4. The succeeding transmission portion 4 may perform shifting with respect to the driving transmitted from the adjustment portion 5.

The adjustment portion 5 may include a first adjustment unit 51.

The first adjustment unit 51 is configured to perform shifting with respect to the driving transmitted from the first clutch unit 31 using the gear ratio. The first adjustment unit 51 may be connected to each of the first clutch unit 31 and the first succeeding transmission unit 41. Accordingly, the first adjustment unit 51 may perform shifting with respect to the driving transmitted from the first clutch unit 31 using the gear ratio and then may output the shifted driving to the first succeeding transmission unit 41. The first succeeding transmission unit 41 may perform shifting with respect to the driving transmitted from the first adjustment unit 51.

The first adjustment unit 51 may include a first adjustment shaft 511, a first adjustment input gear 512, and a first adjustment output gear 513.

The first adjustment shaft 511 may be coupled to the first clutch unit 31. The first adjustment shaft 511 may rotate due to the driving transmitted from the first clutch unit 31. The first adjustment shaft 511 may be disposed to be parallel to the first axial direction (X-axis direction).

The first adjustment input gear 512 may be coupled to the first adjustment shaft 511. The first adjustment input gear 512 may rotate as the first adjustment shaft 511 rotates.

The first adjustment output gear 513 may be engaged to the first adjustment input gear 512 and connected to the first succeeding transmission unit 41. The first adjustment output gear 513 may be coupled to the first succeeding transmission shaft 413. Accordingly, the first adjustment output gear 513 may rotate the first succeeding transmission shaft 413 while rotating as the first adjustment input gear 512 rotates.

The first adjustment output gear 513 and the first adjustment input gear 512 may be formed to have different diameters. Accordingly, the first adjustment unit 51 may perform shifting at a first gear ratio according to a difference between diameters of the first adjustment output gear 513 and the first adjustment input gear 512. Shifting may be performed using the first gear ratio during a process in which driving is transmitted from the first adjustment input gear 512 to the first adjustment output gear 513.

The adjustment portion 5 may include a second adjustment unit 52.

The second adjustment unit 52 is configured to perform shifting with respect to the driving transmitted from the second clutch unit 32 using the gear ratio. The second adjustment unit 52 may be connected to each of the second clutch unit 32 and the second succeeding transmission unit 42. Accordingly, the second adjustment unit 52 may perform shifting with respect to the driving transmitted from the second clutch unit 32 using the gear ratio and then may output the shifted driving to the second succeeding transmission unit 42. The second succeeding transmission unit 42 may perform shifting with respect to the driving transmitted from the second adjustment unit 52.

The second adjustment unit 52 may perform shifting using a gear ratio different from that of the first adjustment unit 51. Accordingly, although the first preceding transmission unit 21 and the second preceding transmission unit 22 are implemented to be equal to each other, due to a difference between the gear ratios of the first adjustment unit 51 and the second adjustment unit 52, the driving changed in speed using mutually different gear shifting rates may be transmitted to the first succeeding transmission unit 41 and the second succeeding transmission unit 42. Accordingly, in the transmission 1 of the agricultural working vehicle according to the present disclosure, even when the first preceding transmission unit 21 and the second preceding transmission unit 22 are implemented to be same, driving adjusted at a different gear shifting rate using the adjustment portion 5 may be implemented to be output according to which one of the first preceding transmission unit 21 and the second preceding transmission unit 22 the driving is output through. Also, the transmission 1 of the agricultural working vehicle according to the present disclosure is implemented to change a gear shifting rate of driving transmitted to the succeeding transmission portion 4 by changing at least one of the gear ratios of the first adjustment unit 51 and the second adjustment unit 52.

The second adjustment unit 52 may include a second adjustment shaft 521, a second adjustment input gear 522, and a second adjustment output gear 523.

The second adjustment shaft 521 may be coupled to the second clutch unit 32. The second adjustment shaft 521 may rotate due to the driving transmitted from the second clutch unit 32. The second adjustment shaft 521 may be disposed to be parallel to the first axial direction (X-axis direction).

The second adjustment input gear 522 may be coupled to the second adjustment shaft 521. The second adjustment input gear 522 may rotate as the second adjustment shaft 521 rotates.

The second adjustment output gear 523 may be engaged to the second adjustment input gear 522 and be connected to the second succeeding transmission unit 42. The second adjustment output gear 523 may be coupled to the second succeeding transmission shaft 423. Accordingly, the second adjustment output gear 523 may rotate the second succeeding transmission shaft 423 while rotating as the second adjustment input gear 522 rotates.

The second adjustment output gear 523 and the second adjustment input gear 522 may be formed to have different diameters. Accordingly, the second adjustment unit 52 may perform shifting at a second gear ratio according to a difference between diameters of the second adjustment output gear 523 and the second adjustment input gear 522. Shifting may be performed using the second gear ratio during a process in which driving is transmitted from the second adjustment input gear 522 to the second adjustment output gear 523.

The gear ratio of the second adjustment output gear 523 to the second adjustment input gear 522 and the gear ratio of the first adjustment output gear 513 to the first adjustment input gear 512 may be implemented to differ from each other. That is, the second gear ratio and the first gear ratio may be implemented to differ from each other. In this case, a difference between diameters of the second adjustment output gear 523 and the second adjustment input gear 522 and a difference between diameters of the first adjustment output gear 513 and the first adjustment input gear 512 may be implemented to differ from each other. Accordingly, although the first preceding transmission unit 21 and the second preceding transmission unit 22 are implemented to differ from each other, the second adjustment unit 52 and the first adjustment unit 51 may transmit driving adjusted at mutually different gear shifting rates to the first succeeding transmission unit 41 and the second succeeding transmission unit 42 depending on which one of the first preceding transmission unit 21 and the second preceding transmission unit 22 the driving is output through.

Figure 16:
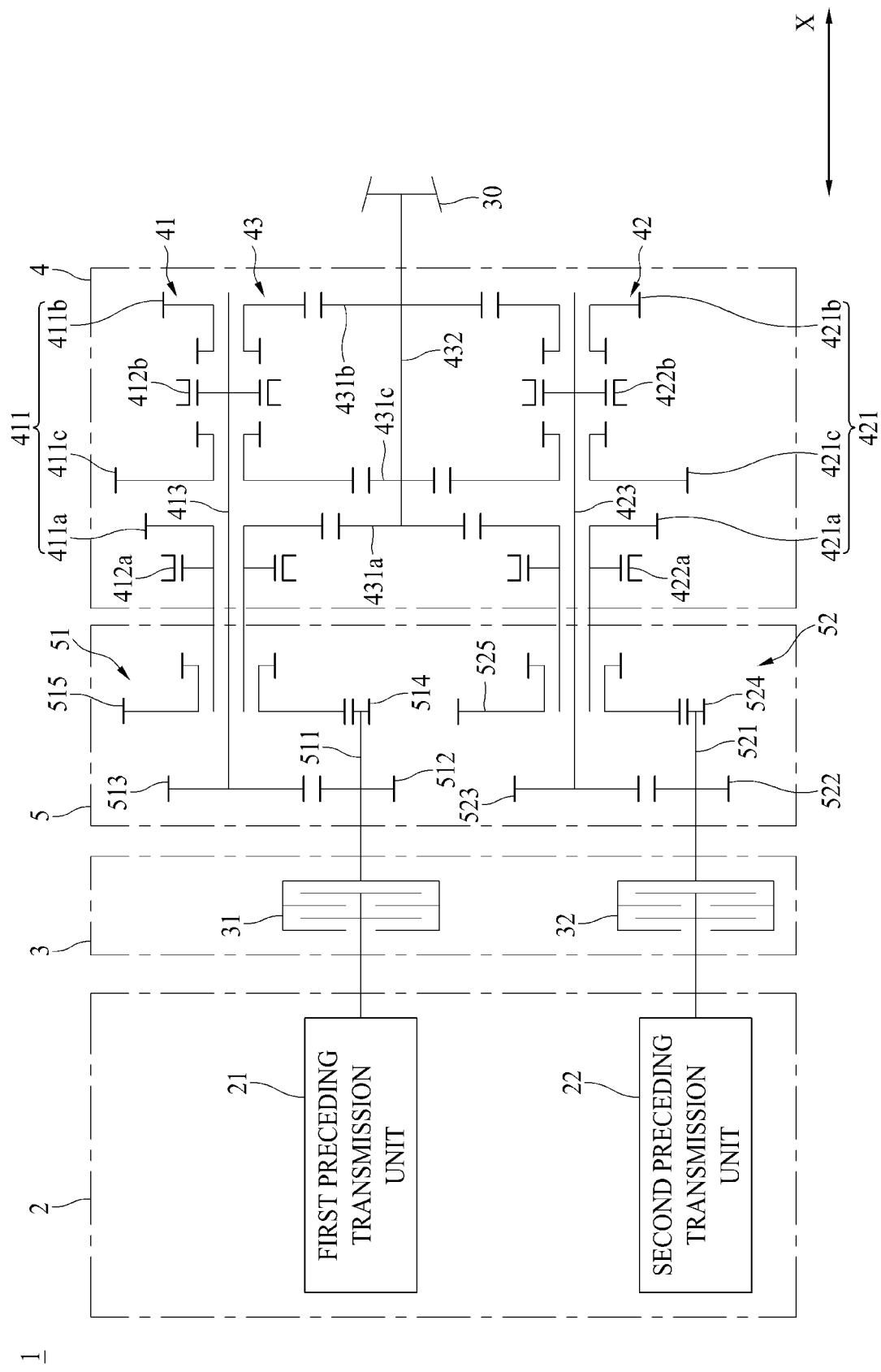
Figure 17:
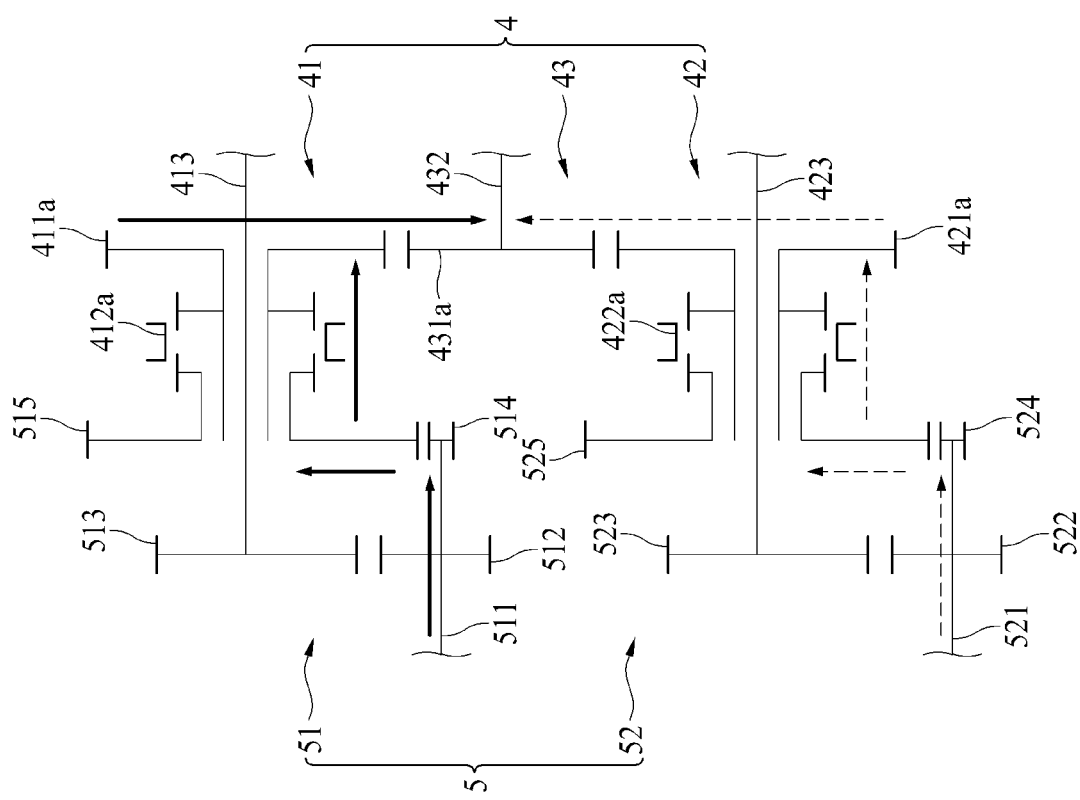

Referring to FIGS. 16 and 17, the first adjustment unit 51 may include a first additional input gear 514 and a first additional output gear 515.

The first additional input gear 514 may be coupled to the first adjustment shaft 511. The first additional input gear 514 may rotate as the first adjustment shaft 511 rotates. The first additional input gear 514 may be coupled to the first adjustment shaft 511 at a position spaced apart from the first adjustment input gear 512.

The first additional output gear 515 may be engaged to the first additional input gear 514 and be connected to the first succeeding transmission unit 41. Accordingly, the first additional output gear 515 may transmit driving to the first succeeding transmission unit 41 while rotating as the first additional input gear 514 rotates. The first additional output gear 515 may be connected to the first succeeding transmission unit 41 at a position spaced apart from the first adjustment output gear 513. Accordingly, the first adjustment unit 51 may transmit driving to the first succeeding transmission unit 41 through the first additional output gear 515 or the first adjustment output gear 513.

The first additional output gear 515 and the first additional input gear 514 may be formed to have different diameters. Accordingly, the first adjustment unit 51 may perform shifting at a third gear ratio according to a difference between diameters of the first additional output gear 515 and the first additional input gear 514. Shifting may be performed using the third gear ratio during a process in which driving is transmitted from the first additional input gear 514 to the first additional output gear 515.

The gear ratio of the first additional output gear 515 to the first additional input gear 514 and the gear ratio of the first adjustment output gear 513 to the first adjustment input gear 512 may be implemented to differ from each other. That is, the third gear ratio and the first gear ratio may be implemented to differ from each other. In this case, a difference between diameters of the first additional input gear 514 and the first additional output gear 515 and a difference between diameters of the first adjustment input gear 512 and the first adjustment output gear 513 may be implemented to differ from each other. Accordingly, the first adjustment unit 51 may transmit driving adjusted at mutually different gear shifting rates to the first succeeding transmission unit 41 depending on which one of the first adjustment output gear 513 and the first additional output gear 515 the driving is output through. In this case, the first additional output gear 515 and the first adjustment output gear 513 may be formed to have different diameters. The first additional input gear 514 and the first adjustment input gear 512 may be formed to have different diameters.

The first additional output gear 515 may be coupled to the first succeeding transmission shaft 413 to be idly rotatable. The first additional output gear 515 may be coupled to the first succeeding transmission gear 411 to be idly rotatable. When the first succeeding transmission unit 41 includes the plurality of first succeeding transmission gears 411, the first additional output gear 515 may be coupled to any one of the first succeeding transmission gears 411 to be idly rotatable. Any one of the first succeeding transmission sleeves 412 (refer to FIG. 15) may be selectively engaged with the first additional output gear 515 and the first succeeding transmission gear 411. For example, the first additional output gear 515 may be coupled to the first low gear 411*a* to be idly rotatable. In this case, the first low-speed sleeve 412*a* may be selectively engaged with the first additional output gear 515 and the first low gear 411*a*. The first high-speed sleeve 412*b* may be selectively engaged with the first high gear 411*c* and the first middle gear 411*b*. Accordingly, the first adjustment unit 51 may further increase a speed difference between driving transmitted through the first low gear 411*a* and driving transmitted through the first high gear 411*c* or the first middle gear 411*b*. When the first low-speed sleeve 412*a* is engaged with the first additional output gear 515 and the first low gear 411*a*, as a solid line shown in FIG. 17, driving may be transmitted to the first succeeding transmission output gear 431*a* via the first adjustment shaft 511, the first additional input gear 514, the first additional output gear 515, the first low-speed sleeve 412*a*, and the first low gear 411*a*.

Referring to FIGS. 16 and 17, the second adjustment unit 52 may include a second additional input gear 524 and a second additional output gear 525.

The second additional input gear 524 may be coupled to the second adjustment shaft 521. The second additional input gear 524 may rotate as the second adjustment shaft 521 rotates. The second additional input gear 524 may be coupled to the second adjustment shaft 521 at a position spaced apart from the second adjustment input gear 522.

The second additional output gear 525 may be engaged to the second additional input gear 524 and be connected to the second succeeding transmission unit 42. Accordingly, the second additional output gear 525 may transmit driving to the second succeeding transmission unit 42 while rotating as the second additional input gear 524 rotates. The second additional output gear 525 may be connected to the second succeeding transmission unit 42 at a position spaced apart from the second adjustment output gear 531. Accordingly, the second adjustment unit 52 may transmit driving to the second succeeding transmission unit 42 through the second additional output gear 525 or the second adjustment output gear 523.

The second additional output gear 525 and the second additional input gear 524 may be formed to have different diameters. Accordingly, the second adjustment unit 52 may perform shifting at a fourth gear ratio according to a difference between diameters of the second additional output gear 525 and the second additional input gear 524. Shifting may be performed using the fourth gear ratio during a process in which driving is transmitted from the second additional input gear 524 to the second additional output gear 525.

The gear ratio of the second additional output gear 525 to the second additional input gear 524 and the gear ratio of the second adjustment output gear 523 to the second adjustment input gear 522 may be implemented to differ from each other. That is, the fourth gear ratio and the second gear ratio may be implemented to differ from each other. In this case, a difference between diameters of the second additional input gear 524 and the second additional output gear 525 and a difference between diameters of the second adjustment input gear 522 and the second adjustment output gear 523 may be implemented to differ from each other. Accordingly, the second adjustment unit 52 may transmit driving adjusted at mutually different gear shifting rates to the second succeeding transmission unit 42 depending on which one of the second adjustment output gear 523 and the second additional output gear 525 the driving is output through. In this case, the second additional output gear 525 and the second adjustment output gear 523 may be formed to have different diameters. The second additional input gear 524 and the second adjustment input gear 522 may be formed to have different diameters. All of the fourth gear ratio, the third gear ratio, the second gear ratio, and the first gear ratio may be implemented to differ from one another.

The second additional output gear 525 may be coupled to the second succeeding transmission shaft 423 to be idly rotatable. The second additional output gear 525 may be coupled to the second succeeding transmission gear 421 to be idly rotatable. When the second succeeding transmission unit 42 includes the plurality of second succeeding transmission gears 421, the second additional output gear 525 may be coupled to any one of the second succeeding transmission gears 421 to be idly rotatable. Any one of the second succeeding transmission sleeves 422 (refer to FIG. 15) may be selectively engaged with the second additional output gear 525 and the second succeeding transmission gear 421. For example, the second additional output gear 525 may be coupled to the second low gear 421a to be idly rotatable. In this case, the second low-speed sleeve 422a may be selectively engaged with the second additional output gear 525 and the second low gear 421a. The second high-speed sleeve 422b may be selectively engaged with the second high gear 421c and the second middle gear 421b. Accordingly, the second adjustment unit 52 may further increase a speed difference between driving transmitted through the second low gear 421a and driving transmitted through the second high gear 421c or the second middle gear 421b. When the second low-speed sleeve 422a is engaged with the second additional output gear 525 and the second low gear 421a, as shown by a dotted line in FIG. 17, driving may be transmitted to the first succeeding transmission output gear 431a via the second adjustment shaft 521, the second additional input gear 524, the second additional output gear 525, the second low-speed sleeve 422a, and the second low gear 421a.

Figure 18:
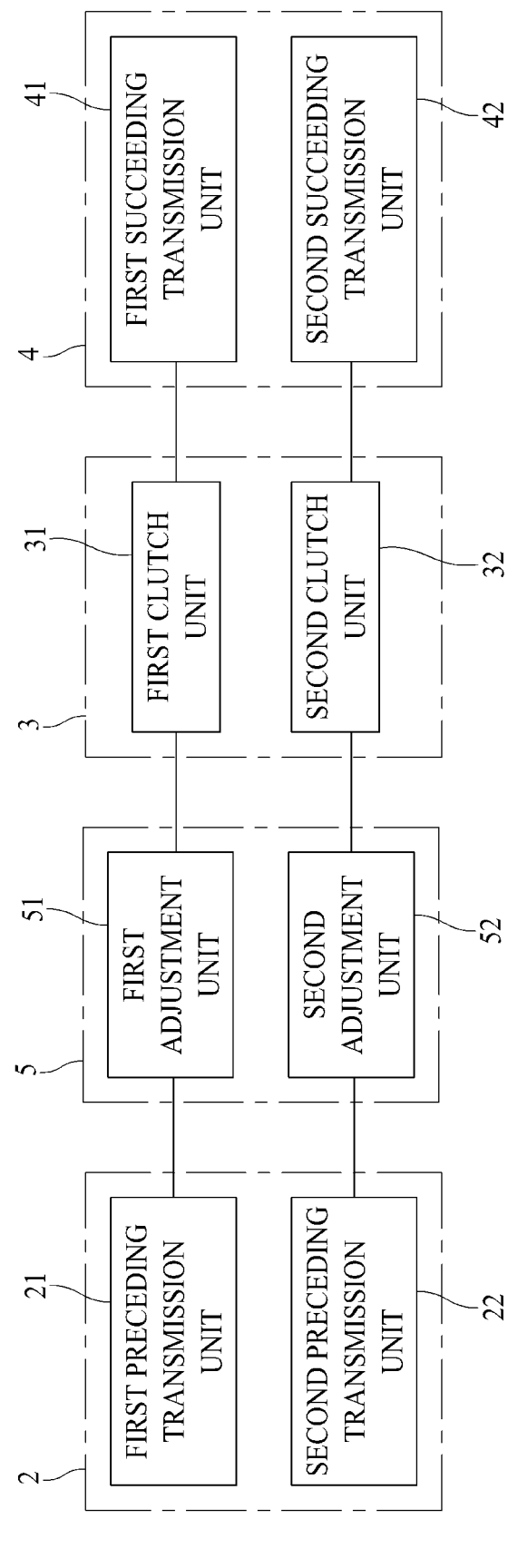
FIG. 18 is a schematic block diagram illustrating a preceding transmission portion, an adjusting portion, a clutch portion, and a succeeding transmission portion in a transmission of an agricultural working vehicle according to a modified embodiment of the present disclosure.
Figure 19:
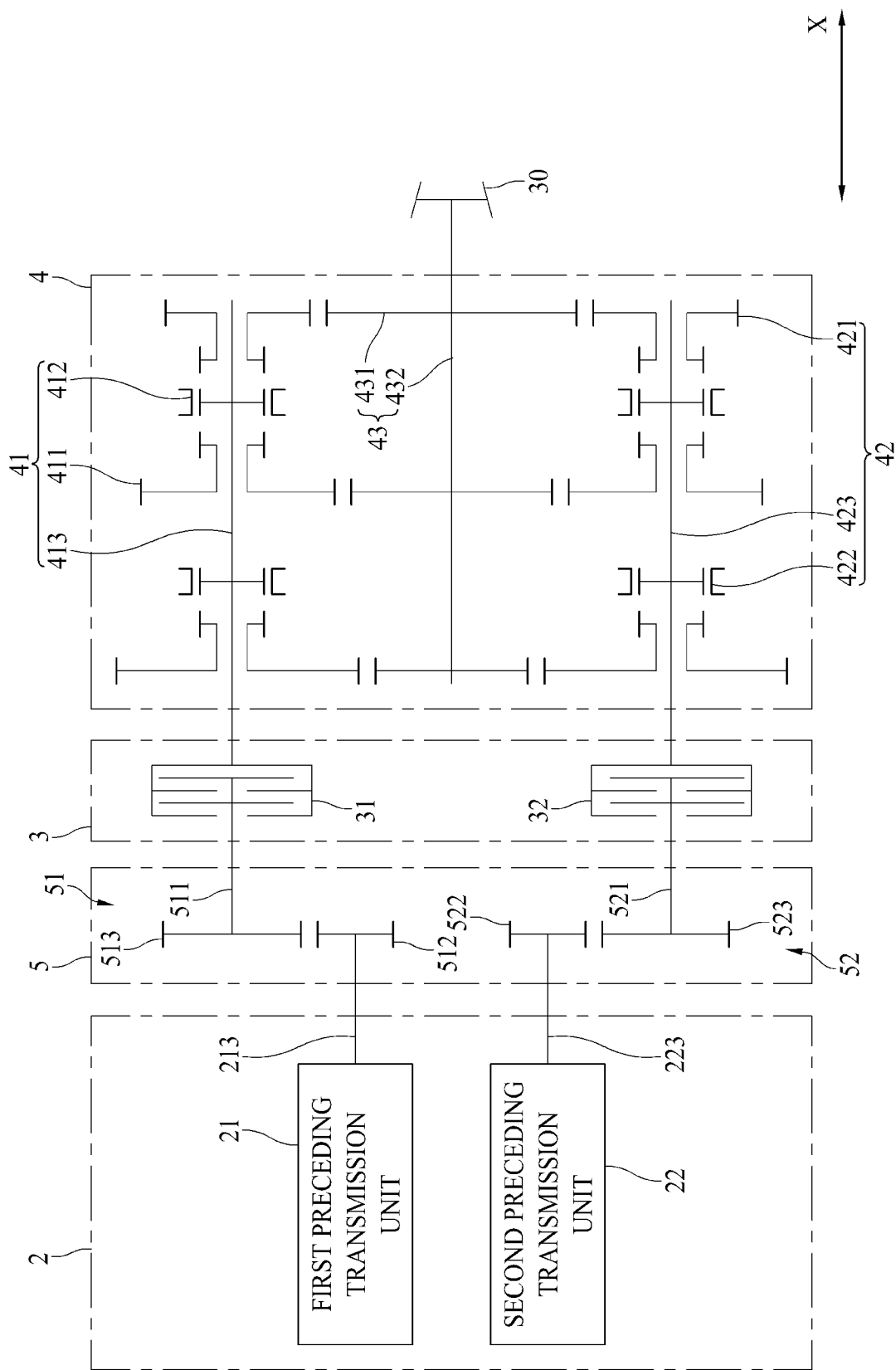
FIG. 19 is a schematic power transmission diagram illustrating the preceding transmission portion, the adjusting portion, the clutch portion, and the succeeding transmission portion in the transmission of the agricultural working vehicle according to the modified embodiment of the present disclosure.

Referring to FIGS. 18 and 19, the transmission 1 of the agricultural working vehicle according to a modified embodiment of the present disclosure may include the preceding transmission portion 2, the clutch portion 3, the succeeding transmission portion 4, and the adjustment portion 5. Since the preceding transmission portion 2, the clutch portion 3, the succeeding transmission portion 4, and the adjustment portion 5 approximately coincide with those described above with respect to the transmission 1 of the agricultural working vehicle according to the present disclosure, only different parts will be described below.

The adjustment portion 5 may be connected to each of the preceding transmission portion 2 and the clutch portion 3. In this case, the adjustment portion 5 may be disposed between the preceding transmission portion 2 and the clutch portion 3. Accordingly, the adjustment portion 5 may perform shifting with respect to driving transmitted from the preceding transmission portion 2 and then output the shifted driving to the clutch portion 3. The clutch portion 3 may be connected to the succeeding transmission portion 4 to selectively output the driving transmitted from the adjustment portion 5 to the succeeding transmission portion 4. The succeeding transmission portion 4 may perform shifting with respect to the driving transmitted from the clutch portion 3.

When the adjustment portion 5 includes the first adjustment unit 51 and the second adjustment unit 52, the first adjustment unit 51 and the second adjustment unit 52 may be implemented as follows.

The first adjustment unit 51 may be connected to each of the first preceding transmission unit 21 and the first clutch unit 31. The first adjustment unit 51 may be connected to the first preceding transmission unit 21 to perform shifting with respect to driving transmitted from the first preceding transmission unit 21 using a gear ratio. The first clutch unit 31 may be connected to the first adjustment unit 51 to selectively output driving transmitted from the first adjustment unit 51. The first succeeding transmission unit 41 may be connected to the first clutch unit 31 to perform shifting with respect to driving transmitted from the first clutch unit 31. When the first clutch unit 31 outputs driving, driving transmitted from the engine 10 (refer to FIG. 3) may be output to the axle via the first preceding transmission unit 21, the first adjustment unit 51, the first clutch unit 31, and the first succeeding transmission unit 41.

The first adjustment unit 51 may include the first adjustment shaft 511, the first adjustment input gear 512, and the first adjustment output gear 513. The first adjustment shaft 511 may be connected to each of the first adjustment output gear 513 and the first clutch unit 31. The first adjustment input gear 512 may be coupled to the first preceding transmission shaft 213. The first adjustment output gear 513 may be engaged with the first adjustment input gear 512. Driving transmitted from the first preceding transmission unit 21 through the first preceding transmission shaft 213 may be transmitted to the first clutch unit 31 via the first adjustment input gear 512, the first adjustment output gear 513, and the first adjustment shaft 511.

The second adjustment unit 52 may be connected to each of the second preceding transmission unit 22 and the second clutch unit 32. The second adjustment unit 52 may be connected to the second preceding transmission unit 22 to perform shifting with respect to driving transmitted from the second preceding transmission unit 22 using a gear ratio different from that of the first adjustment unit 51. The second clutch unit 32 may be connected to the second adjustment unit 52 to selectively output driving transmitted from the second adjustment unit 52. The second succeeding transmission unit 42 may be connected to the second clutch unit 32 to perform shifting with respect to driving transmitted from the second clutch unit 32. When the second clutch unit 32 outputs driving, driving transmitted from the engine 10 (refer to FIG. 3) may be output to the axle via the second preceding transmission unit 22, the second adjustment unit 52, the second clutch unit 32, and the second succeeding transmission unit 42.

The second adjustment unit 52 may include the second adjustment shaft 521, the second adjustment input gear 522, and the second adjustment output gear 523. The second adjustment shaft 521 may be connected to each of the second adjustment output gear 523 and the second clutch unit 32. The second adjustment input gear 522 may be coupled to the second preceding transmission shaft 223. The second adjustment output gear 523 may be engaged with the second adjustment input gear 522. Driving transmitted from the second preceding transmission unit 22 through the second preceding transmission shaft 223 may be transmitted to the second clutch unit 32 via the second adjustment input gear 522, the second adjustment output gear 523, and the second adjustment shaft 521.

Here, the adjustment portion 5 may perform a main function which is different according to an implemented form of each of the preceding transmission portion 2 and the succeeding transmission portion 4. This will be described in detail as follows.

First, when the first preceding transmission unit 21 and the second preceding transmission unit 22 are implemented to be equal to each other and the first succeeding transmission unit 41 and the second succeeding transmission unit 42 are implemented to be equal to each other, the adjustment portion 5 may generally perform a function of shifting to output driving at speed different according to which one of the first preceding transmission unit 21 and the second preceding transmission unit 22 the driving is transmitted through. In this case, the first preceding transmission gear 211 and the second preceding transmission gear 221 which are engaged with each of the preceding transmission input gears 231 of the first preceding transmission unit 21 may be formed to have the same diameter. The first succeeding transmission gear 411 and the second succeeding transmission gear 421 which are engaged with each of the succeeding transmission output gears 431 of the first succeeding transmission unit 41 may be formed to have the same diameter.

Next, when the first preceding transmission unit 21 and the second preceding transmission unit 22 are implemented to be equal to each other and the first succeeding transmission unit 41 and the second succeeding transmission unit 42 are implemented to be different from each other, the adjustment portion 5 may generally perform a function of sharing speed reduction shifting performed by at least one of the first succeeding transmission unit 41 and the second succeeding transmission unit 42. In this case, the first preceding transmission gear 211 and the second preceding transmission gear 221 which are engaged with each of the preceding transmission input gears 231 of the first preceding transmission unit 21 may be formed to have the same diameter. The first succeeding transmission gear 411 and the second succeeding transmission gear 421 which are engaged with each of the succeeding transmission output gears 431 of the first succeeding transmission unit 41 may be formed to have different diameters.

Next, when the first preceding transmission unit 21 and the second preceding transmission unit 22 are implemented to be different from each other and the first succeeding transmission unit 41 and the second succeeding transmission unit 42 are implemented to be equal to each other, the adjustment portion 5 may generally perform a function of sharing speed reduction shifting performed by at least one of the first preceding transmission unit 21 and the second preceding transmission unit 22. In this case, the first preceding transmission gear 211 and the second preceding transmission gear 221 which are engaged with each of the preceding transmission input gears 231 of the first preceding transmission unit 21 may be formed to have different diameters. The first succeeding transmission gear 411 and the second succeeding transmission gear 421 which are engaged with each of the succeeding transmission output gears 431 of the first succeeding transmission unit 41 may be formed to have the same diameter.

Next, when the first preceding transmission unit 21 and the second preceding transmission unit 22 are implemented to be different from each other and the first succeeding transmission unit 41 and the second succeeding transmission unit 42 are implemented to be different from each other, the adjustment portion 5 may generally perform a function of sharing speed reduction shifting performed by at least one of the first preceding transmission unit 21, the second preceding transmission unit 22, the first succeeding transmission unit 41, and the second succeeding transmission unit 42. In this case, the first preceding transmission gear 211 and the second preceding transmission gear 221 which are engaged with each of the preceding transmission input gears 231 of the first preceding transmission unit 21 may be formed to have different diameters. The first succeeding transmission gear 411 and the second succeeding transmission gear 421 which are engaged with each of the succeeding transmission output gears 431 of the first succeeding transmission unit 41 may be formed to have different diameters.

Meanwhile, the adjustment portion 5 may be implemented to perform a function of transmitting the driving transmitted from the engine 10 to another shaft in addition to a shaft which connects the first preceding transmission portion 2, the clutch portion 3, and the succeeding transmission portion 4.

The present disclosure described above is not limited to the above-described embodiments and the accompanying drawings. It should be apparent to those of ordinary skill in the art to which the present disclosure pertains that various substitutions, modifications, and changes are possible within the scope not departing from the technical idea of the present disclosure.

The invention claimed is:

1. A transmission of an agricultural working vehicle, the transmission comprising:
a preceding transmission input shaft configured to rotate due to driving transmitted from an engine;
a first preceding transmission shaft configured to perform shifting with respect to driving of the preceding transmission input shaft and to output the shifted driving;
a first succeeding transmission shaft configured to be selectively connected or disconnected to the first preceding transmission shaft;
a first clutch unit configured to selectively connect or disconnect the first preceding transmission shaft to the first succeeding transmission shaft;
a second preceding transmission shaft disposed to be parallel to the first preceding transmission shaft and configured to perform shifting with respect to the driving of the preceding transmission input shaft and to output the shifted driving;
a second succeeding transmission shaft disposed to be parallel to the first succeeding transmission shaft and configured to be selectively connected or disconnected to the second preceding transmission shaft;
a second clutch unit configured to selectively connect or disconnect the second preceding transmission shaft to the second succeeding transmission shaft;
a succeeding transmission output shaft configured to perform shifting with respect to driving of the first succeeding transmission shaft or driving of the second succeeding transmission shaft and to output the shifted driving;
a first adjustment shaft coupled to the first clutch unit;
a first adjustment input gear coupled to the first adjustment shaft and configured to rotate as the first adjustment shaft rotates;
a first adjustment output gear engaged with the first adjustment input gear and coupled to the first succeeding transmission shaft;
a second adjustment shaft disposed to be parallel to the first adjustment shaft and coupled to the second clutch unit;
a second adjustment input gear coupled to the second adjustment shaft and configured to rotate as the second adjustment shaft rotates; and
a second adjustment output gear engaged with the second adjustment input gear and coupled to the second succeeding transmission shaft;
wherein, even when both the driving of the first preceding transmission shaft and the driving of the second preceding transmission shaft are outputted, the succeeding transmission output shaft outputs the shifted driving after the driving is selectively inputted to the first succeeding transmission shaft or the second succeeding transmission shaft since the first clutch unit and the second clutch unit selectively transmit the driving,
wherein a gear shifting rate between the preceding transmission input shaft and the first preceding transmission shaft is the same as a gear shifting rate between the preceding transmission input shaft and the second preceding transmission shaft.

2. The transmission of claim 1, wherein a first gear ratio of the first adjustment output gear to the first adjustment input gear and a second gear ratio of the second adjustment output gear to the second adjustment input gear are different from each other.

3. The transmission of claim 2, wherein a gear shifting rate between the first succeeding transmission shaft and the succeeding transmission output shaft is the same as a gear shifting rate between the second succeeding transmission shaft and the succeeding transmission output shaft.

4. The transmission of claim 2, further comprising:
a first additional input gear coupled to the first adjustment shaft at a position spaced apart from the first adjustment input gear and configured to rotate as the first adjustment shaft rotates;
a first additional output gear engaged with the first additional input gear and coupled to the first succeeding transmission shaft to be idly rotatable;
a first low gear coupled to the first succeeding transmission shaft to be idly rotatable and coupled to the first additional output gear to be idly rotatable; and
a first succeeding transmission output gear coupled to the succeeding transmission output shaft to rotate as the succeeding transmission output shaft rotates and engaged with the first low gear.

5. The transmission of claim 1, wherein the first preceding transmission shaft and the first adjustment shaft are located in a straight line, and the second preceding transmission shaft and the second adjustment shaft are located in a straight line.

6. The transmission of claim 1, wherein a distance between the first adjustment shaft and the first succeeding transmission shaft is the same as a distance between the second adjustment shaft and the second succeeding transmission shaft.

7. The transmission of claim 1, wherein a distance between the preceding transmission input shaft and the first preceding transmission shaft is the same as a distance between the preceding transmission input shaft and the second preceding transmission shaft.

8. The transmission of claim 1, wherein a distance between the first succeeding transmission shaft and the succeeding transmission output shaft is the same as a distance between the second succeeding transmission shaft and the succeeding transmission output shaft.

9. A transmission of an agricultural working vehicle, the transmission comprising:
a preceding transmission input shaft configured to rotate due to driving transmitted from an engine;
a first preceding transmission shaft configured to perform shifting with respect to driving of the preceding transmission input shaft and to output the shifted driving;
a first succeeding transmission shaft configured to be selectively connected or disconnected to the first preceding transmission shaft;
a first clutch unit configured to selectively connect or disconnect the first preceding transmission shaft to the first succeeding transmission shaft;
a second preceding transmission shaft disposed to be parallel to the first preceding transmission shaft and configured to perform shifting with respect to the driving of the preceding transmission input shaft and to output the shifted driving;
a second succeeding transmission shaft disposed to be parallel to the first succeeding transmission shaft and configured to be selectively connected or disconnected to the second preceding transmission shaft;
a second clutch unit configured to selectively connect or disconnect the second preceding transmission shaft to the second succeeding transmission shaft;
a succeeding transmission output shaft configured to perform shifting with respect to driving of the first succeeding transmission shaft or driving of the second succeeding transmission shaft and to output the shifted driving;
a first adjustment shaft coupled to the first clutch unit;
a first adjustment input gear coupled to the first adjustment shaft and configured to rotate as the first adjustment shaft rotates;
a first adjustment output gear engaged with the first adjustment input gear and coupled to the first succeeding transmission shaft;
a second adjustment shaft disposed to be parallel to the first adjustment shaft and coupled to the second clutch unit;
a second adjustment input gear coupled to the second adjustment shaft and configured to rotate as the second adjustment shaft rotates; and
a second adjustment output gear engaged with the second adjustment input gear and coupled to the second succeeding transmission shaft;
wherein, even when both the driving of the first preceding transmission shaft and the driving of the second preceding transmission shaft are outputted, the succeeding transmission output shaft outputs the shifted driving after the driving is selectively inputted to the first succeeding transmission shaft or the second succeeding transmission shaft since the first clutch unit and the second clutch unit selectively transmit the driving,
wherein a gear shifting rate between the first succeeding transmission shaft and the succeeding transmission output shaft is the same as a gear shifting rate between the second succeeding transmission shaft and the succeeding transmission output shaft.

10. The transmission of claim 9, wherein a first gear ratio of the first adjustment output gear to the first adjustment input gear and a second gear ratio of the second adjustment output gear to the second adjustment input gear are different from each other.

\* \* \* \* \*